US007007279B2

(12) United States Patent
Uehara et al.

(10) Patent No.: US 7,007,279 B2
(45) Date of Patent: Feb. 28, 2006

(54) APPARATUS FOR SWITCHING AN OBJECT MANAGING METHOD AND A METHOD THEREOF

(75) Inventors: Tadahiro Uehara, Kawasaki (JP); Rieko Yamamoto, Kawasaki (JP); Yoshihiro Otagiri, Kawasaki (JP); Masataka Murabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 09/812,562

(22) Filed: Mar. 21, 2001

(65) Prior Publication Data
US 2001/0037413 A1 Nov. 1, 2001

(30) Foreign Application Priority Data
Apr. 28, 2000 (JP) .............................. 2000-129655

(51) Int. Cl.
*G06F 9/44* (2006.01)
(52) U.S. Cl. ...................... 719/315; 719/316; 718/101; 707/103 Y
(58) Field of Classification Search ................ 719/315, 719/316, 320, 332; 707/103 Y; 718/101
See application file for complete search history.

(56) References Cited

U.S. PATENT DOCUMENTS

| 6,016,495 A | * | 1/2000 | McKeehan et al. ......... 709/203 |
| 6,442,564 B1 | * | 8/2002 | Frey et al. .................. 709/327 |
| 6,470,354 B1 | * | 10/2002 | Aldridge et al. ........ 707/103 Y |
| 6,513,040 B1 | * | 1/2003 | Becker et al. ................ 707/10 |
| 6,785,690 B1 | * | 8/2004 | Davidson ................ 707/103 Y |

OTHER PUBLICATIONS

Sun Microsystems, Inc., "Enterprise JavaBeans™ Specification, v1.1", Chapters 8 and 9, ftp://ftp.java.sun.com/pub/ejb/llfinal-129822/ejbl_1-spec.pdf, Dec. 17, 1999.

* cited by examiner

*Primary Examiner*—Meng-Al T. An
*Assistant Examiner*—Li Zhen
(74) *Attorney, Agent, or Firm*—Staas & Halsey LLP

(57) ABSTRACT

In a system configuring and executing an application by combining a plurality of components, a method suitable for the type of a component is selected from a plurality of object managing methods, and an object caching part and an object persistence processing part corresponding to the method are included in a component base.

3 Claims, 29 Drawing Sheets

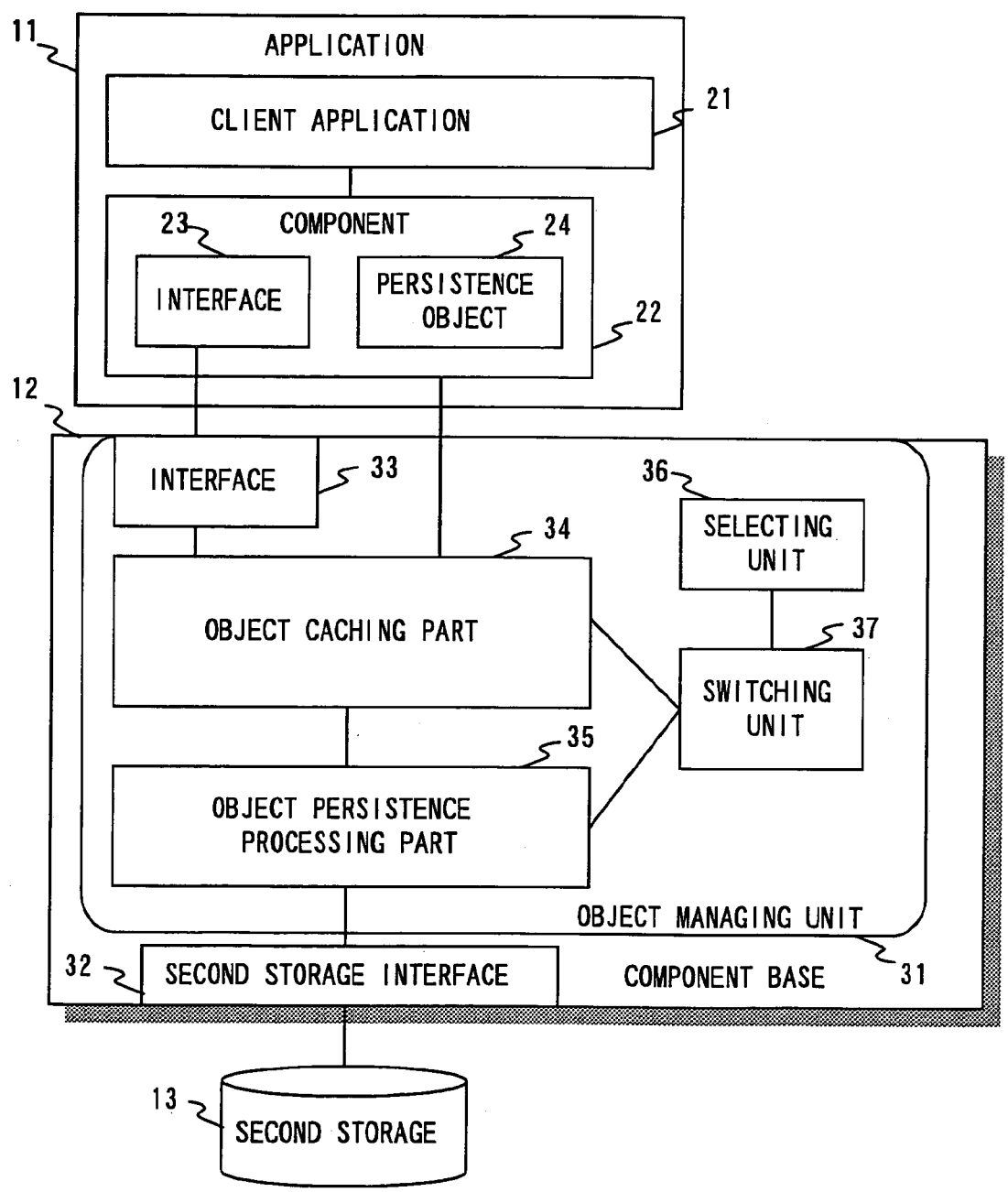
F I G. 2

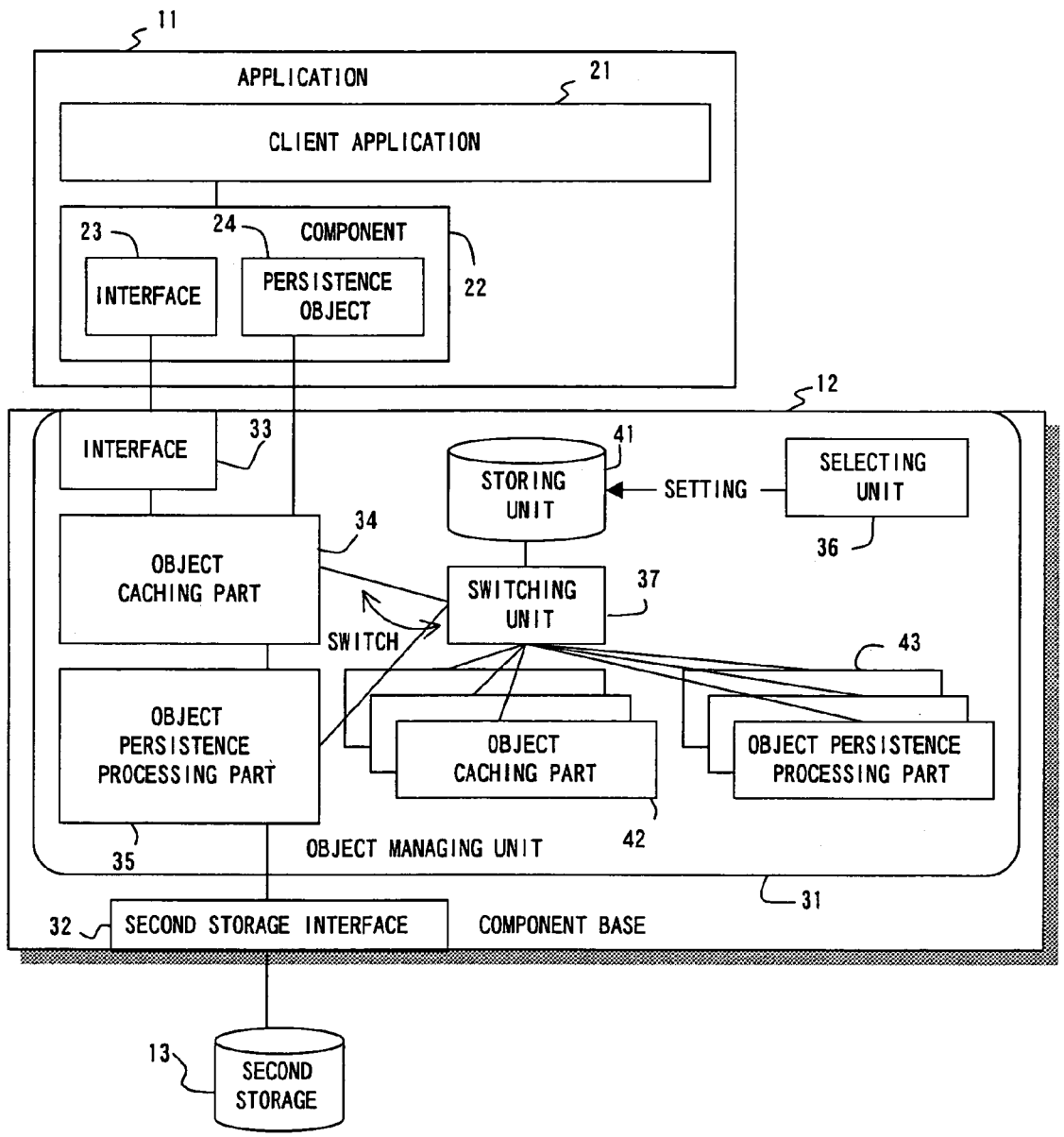
F I G. 6

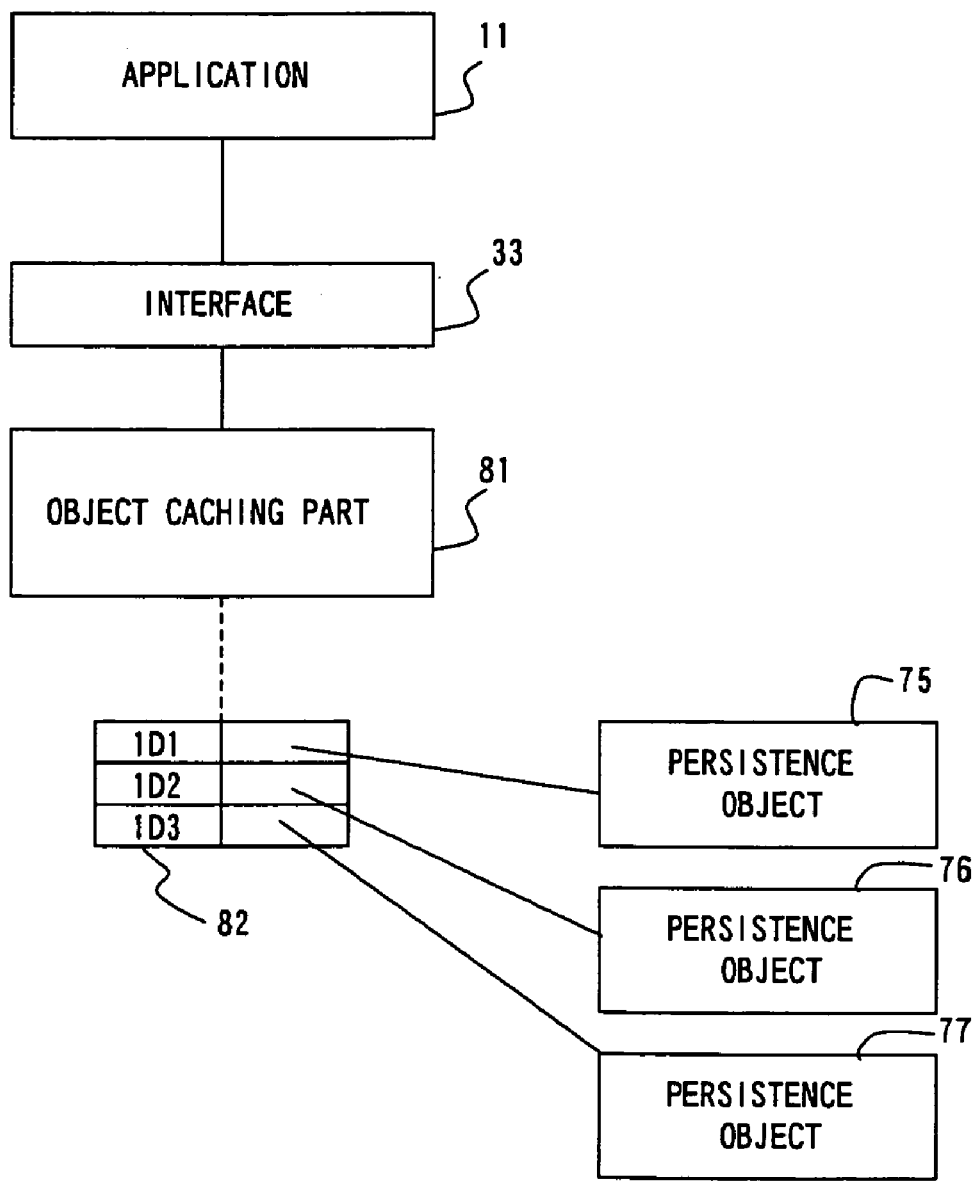
F I G. 1 3

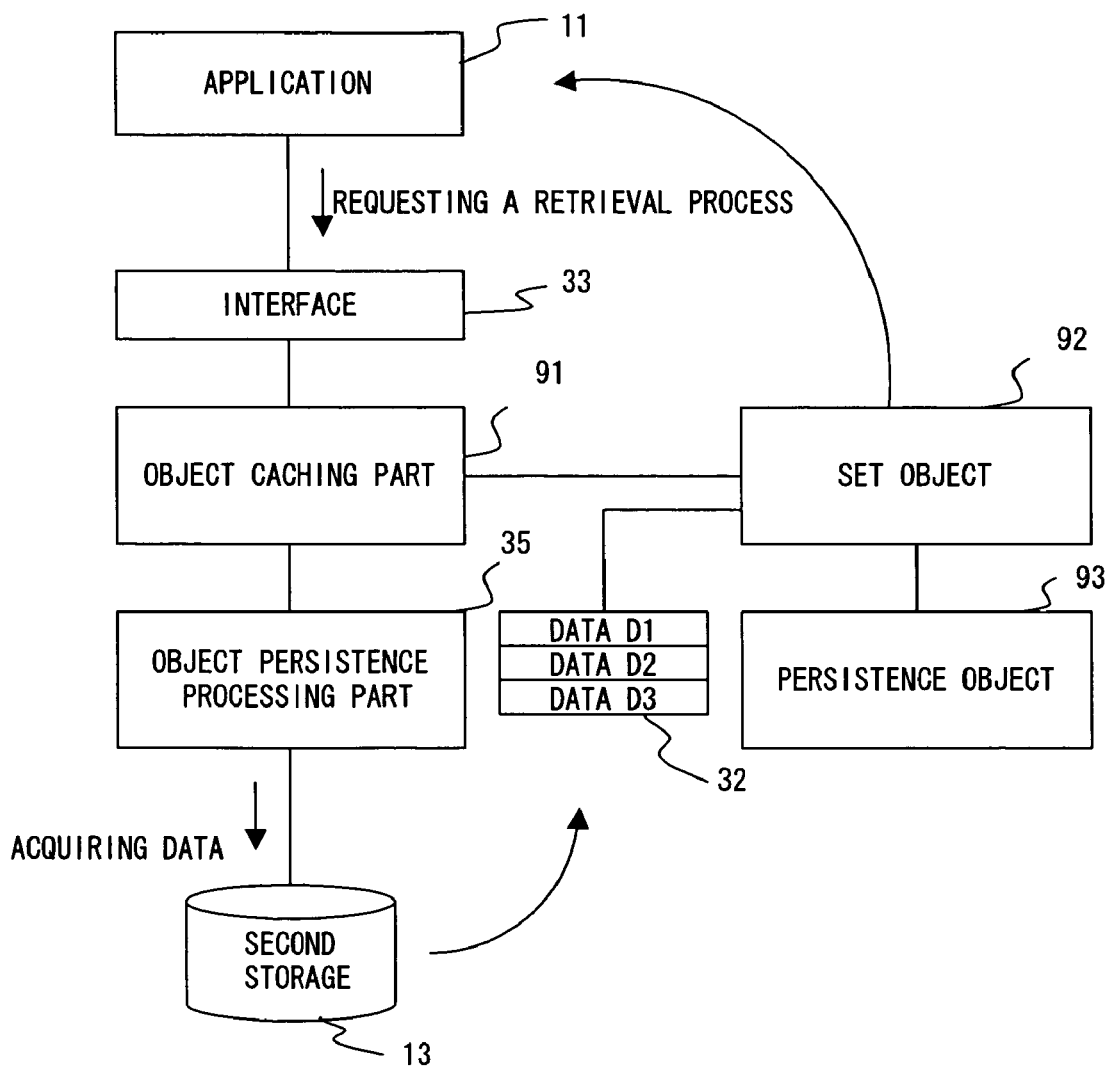
F I G. 1 4

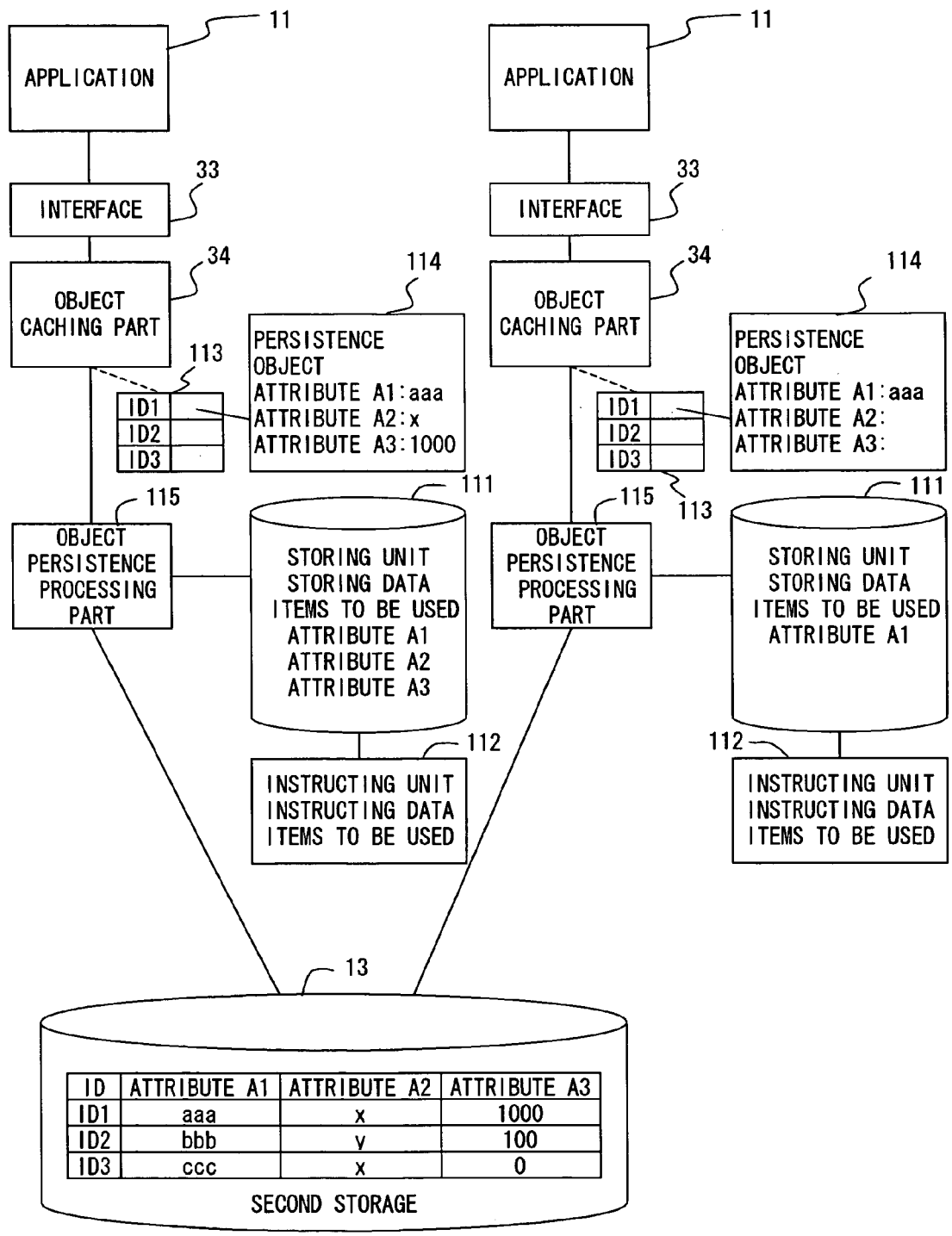
F I G. 19

```
public class $$Bean$$Cache
{
    Hashtable cacheTableHash;
    $$Bean$$Persistence objPersistence;

$$Bean$$ findByPrimaryKey($$PrimaryKey$$ pk)
    {
        String transactionID = getTransactionID();
        Hashtable cacheTable = (Hashtable)cacheTableHash.get(transactionID);
        $$Bean$$ bean = cacheTable.get(pk);

if (bean != null) return bean;

bean = objPersistence.findBean(pk);
        cacheTable.put(pk,bean);
        return bean;
    }
    ...
}
```

FIG. 21

```
public class $$Bean$$Persistence
{
    DataSource dataSource;

$$Bean$$ findBean($$PrimaryKey$$ pk)
    {
        $$Bean$$ bean = null;
        Connection connection = getConnection();
        String sql = "SELECT $$BeanFieldColumns$$ FROM $$Table$$ WHERE
            $$PKFieldColumns$$ = ?";
        Statement statement = connection.preparedStatement(sql);

//$$ foreach $$PKFields$$
        statement.set$$Type$$($$Count$$,pk.$$Name$$);
        //$$ end foreach ResultSet rs = statement.executeQuery();
        while(rs.next())
        {
            bean = new $$Bean$$();
            //$$ foreach $$BeanFields$$
            bean.$$Name$$ = rs.get$$Type$$($$Count$$);
            //$$ end foreach
        }
        return bean;
    }
    ...
}
```

FIG. 22

```
public class OrderBeanCache
{
    Hashtable cacheTableHash;
    OrderBeanPersistence objPersistence;

OrderBean findByPrimaryKey(OrderBeanPrimaryKey pk)
    {
        String transactionID = getTransactionID();
        Hashtable cacheTable = (Hashtable)cacheTableHash.get(transactionID);
        OrderBean bean = cacheTable.get(pk);

if (bean != null) return bean;

bean = objPersistence.findBean(pk);
        cacheTable.put(pk,bean);
        return bean;
    }
    ....
}
```

FIG. 23

```
public class OrderBeanPersistence
{
    DataSource dataSource;

OrderBean findBean(OrderBeanPrimaryKey pk)
    {
        OrderBean bean = null;
        Connection connection = getConnection();
        String sql = "SELECT ID,PRODUCT,QUANTITY FROM ORDERTABLE WHERE ID = ?";
        Statement statement = connection.preparedStatement(sql);

statement.setString(1,pk.id);
        statement.setString(2,pk.product);
        statement.setInt(3,pk.quantity);

ResultSet rs = statement.executeQuery();
        while(rs.next())
        {
            bean = new OrderBean();
            bean.id = rs.getString(1);
            bean.product = rs.getString(2);
            bean.quantity = rs.getInt(3);
        }
        return bean;
    }
    ....
}
```

FIG. 24

```
public class ObjectCacheOption1 extends ObjectCache
{
    Hashtable cacheTableHash;
    ObjectPersistence objPersistence;

Object findByPrimaryKey(Object pk, BeanDef beanDef)
    {
        String transactionID = getTransactionID();
        Hashtable cacheTable = (Hashtable)cacheTableHash.get(transactionID);
        Object bean = cacheTable.get(pk);

if (bean != null) return bean;

bean = objPersistence.findBean(pk,beanDef,"findByPrimaryKey");
        cacheTable.put(pk,bean);
        return bean;
    }
    ...
}
```

FIG. 25

```
public class ObjectPersistenceOption1 extends ObjectPersistence
{
    DataSource dataSource;

Object findBean(Object pk, BeanDef beanDef, String finderName)
    {
        Object bean = null;
        Connection connection = getConnection();
        String sql = beanDef.getSQL(finderName);
        Statement statement = connection.preparedStatement(sql);

Enumeration fields = beanDef.getFields();
        while (fields.hasMoreElements())
        {
            FieldDef field = (FieldDef)fields.nextElement();
            setValue(statement,field);
        }

ResultSet rs = statement.executeQuery();
        while(rs.next())
        {
            bean = beanDef.newInstance();
            fields = beanDef.getFields();
            while (fields.hasMoreElements())
            {
                FieldDef field = (FieldDef)fields.nextElement();
                setValue(bean,rs,field);
            }
        }
        return bean;
    } void setValue(Object bean, ResultSet, FieldDef field)
    {
        Field f = field.getField();
        switch (field.fieldType)
        {
            case FT_INT:
                f.setInt(bean,rs.getInt(field.getColumn()));
                break;
            case FT_LONG:
                f.setLong(bean,rs.getLong(field.getColumn()));
                break;
            ...
        }
    }
    ...
}
```

FIG. 26

APPARATUS FOR SWITCHING AN OBJECT MANAGING METHOD AND A METHOD THEREOF

BACKGROUND OF THE INVENTION

1. Field of the Invention

The present invention relates to an object-oriented programming process. Especially, it relates to an object managing apparatus for configuring and executing an application program by combining components, and a method thereof.

2. Description of the Related Art

The application programs (applications) of a business system, etc., are often configured by combining program units called components. At the time of configuring/operating (executing) such an application, the component base offers each component, a second storage access function (for example, a database access function), a transaction function, a communication function in distributed environments, etc.

Among these functions, the second storage access function is to access the second storage in accordance with the request from the application, and to write or read the data of a persistence object that is designated by the component. Here, the persistence object indicates the object corresponding to the data in the second storage. This object has a life span as long as that of the data in the second storage.

Since the frequency of writing to/reading from the second storage is greatly related to the performance of the whole application, the caching mechanism of an object is used many times in order to cut the number of accesses to the second storage. In this mechanism, an object with data that has been read from the second storage in the past, is accumulated in the cache in a memory. In the case that the same data is required to be retrieved, the object in the cache is used.

However, there is the following problem in the caching process in the above-mentioned conventional component base.

In the caching process of an object, the validity of the data in a cache becomes important. For example, when an object is registered in a cache and then the application that does not use the cache, modifies the data of the second storage corresponding to the registered object, the data of the object in the cache does not match the data of the second storage.

In this case, a mechanism for performing a caching process that is limited to one transaction process and invalidating the result of the transaction process when data is modified at the time of the termination of the transaction process is required.

However, in the case that the data in the second storage is not modified at all, it is guaranteed that the data of the object and the data in the second storage are always the same. Therefore, the object that is registered in the cache, is always effective.

The caching mechanism possessed by the conventional component base is either the caching mechanism with few effects such that all the applications can be securely actuated or the caching mechanism that is optimized under the application restriction that is imposed on the component base itself. Therefore, there it no alternative to providing a caching mechanism on the application side to materialize the caching strategy suitable for the individual application, thereby increasing the load of application development.

SUMMARY OF THE INVENTION

It is an object of the present invention to offer an object managing apparatus and the method for providing a caching mechanism suitable for respective applications in a component base, in a system for configuring and executing an application by combining components.

The object managing apparatus of the present invention is provided with a selecting device and a switching device. The apparatus manages an object that is used by an application program including at least one component, in the component base that is a base for configuring and executing an application program.

The selecting device selects an object managing method suitable for the type of the component from a plurality of object managing methods that are prepared in advance. In the component base, the switching device switches at least one of an object caching part for caching the persistence object corresponding to the data of an external storage using a specific algorithm and an object persistence processing part for performing conversion between the data of external storage and the persistence object, with apart corresponding to the selected object managing method.

BRIEF DESCRIPTION OF THE DRAWINGS

FIG. 2 is a diagram showing the configuration of the first system;

FIG. 6 is a diagram showing the configuration of the fourth system;

FIG. 13 is a diagram showing parts which perform referring processes;

FIG. 14 is a diagram showing sequentially processing parts;

FIG. 19 is a diagram showing parts for selecting data items to be used;

FIG. 21 shows an example of the template of an object caching part;

FIG. 22 shows an example of an object persistence processing part;

FIG. 23 shows an example of a generating program of the object caching part;

FIG. 24 shows an example of a generating program of the object persistence processing part;

FIG. 25 shows an example of the object caching part;

FIG. 26 shows an example of the object persistence processing part;

DESCRIPTION OF THE PREFERRED EMBODIMENTS

The following is a detailed explanation of the embodiments of the present invention with reference to the drawings.

Figure 1:
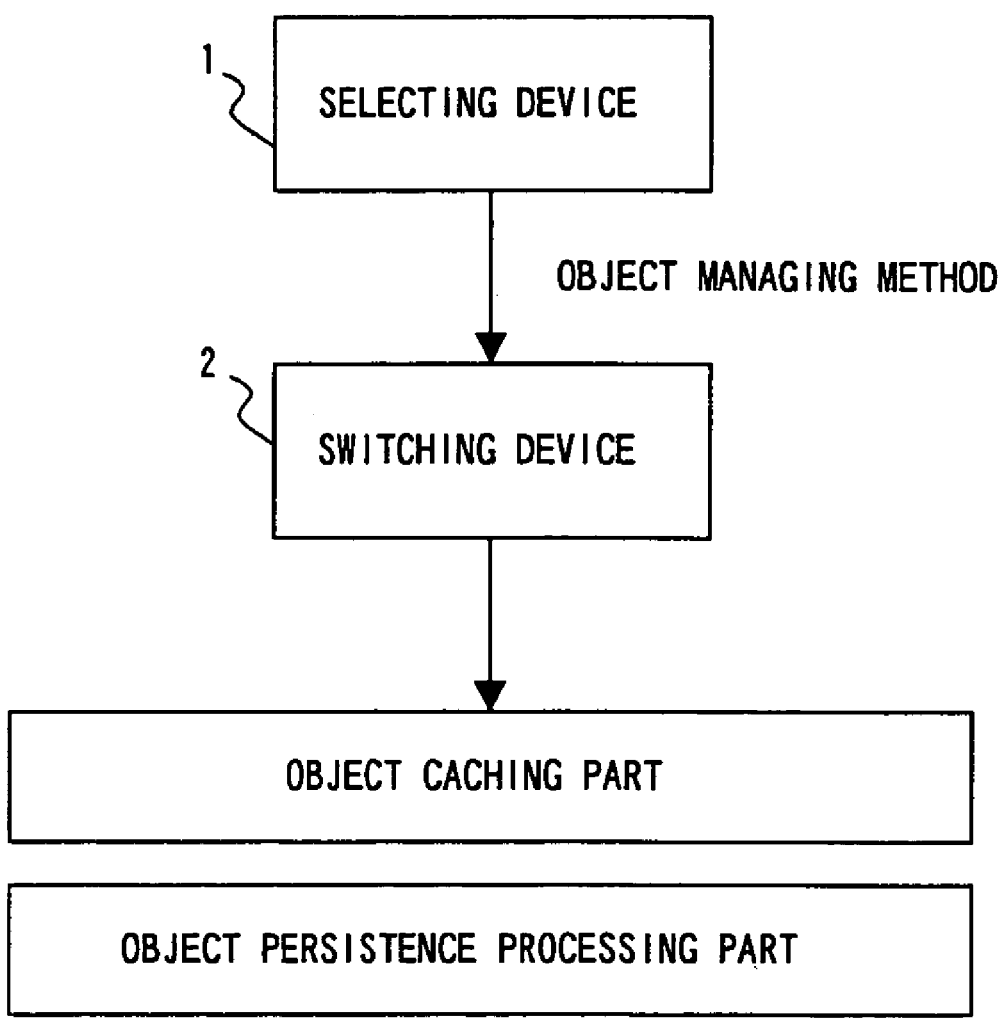
FIG. 1 is a block diagram of the object managing apparatus of the present invention.

FIG. 1 is a block diagram of the object managing apparatus of the present invention. The object managing apparatus of FIG. 1 is provided with a selecting device 1 and a switching device 2. The apparatus manages an object that is used by an application program including at least one component, in the component base that is a base for configuring and executing the application program.

The selecting device 1 selects an object managing method suitable for the type of component from a plurality of object managing methods that are prepared in advance. In the component base, the switching device 2 switches at least one of an object caching part for caching the persistence object corresponding to the data of the external storage using a specific algorithm and an object persistence processing part for performing conversion between the data of the external storage and a persistence object, with a part corresponding to the selected object managing method.

The object managing method expresses the algorithm for managing the object that is used in the system, and includes an accessing method to the data that is stored in the external storage. The external storage corresponds to, for example, the second storage.

The selecting device 1 sends the information of the selected object managing method to the switching device 2 directly or through a storing unit. The switching device 2 switches at least one of the object caching part and object persistence processing part which are offered by the component base with the part suitable for the type of component, in accordance with the notified object managing method. The object managing apparatus caches the persistence object using the thus-switched part.

According to such an object managing apparatus, an appropriate object caching part and an appropriate object persistence processing part are automatically incorporated for each type of component, in the component base. Therefore, the caching mechanism suitable for the individual application can be automatically offered.

For example, the selecting device 1 and switching device 2 of FIG. 1 correspond to a selecting unit 36 and a switching unit 37 of FIG. 2 that are respectively described later.

In the present embodiment, the object managing method of a caching mechanism, etc., offered by the component base, are automatically switched with the method suitable for the nature of the application. As the nature of the application, the usage, processing method, etc., of the data to be processed by the application are considered. The caching mechanism that is prepared on the application side is no longer required by changing the object managing method in accordance with the application, thereby decreasing the number of processes required for the application development.

FIG. 2 is a diagram showing the basic configuration of the system of the present embodiment for performing a process of information between a client and a server. The system of FIG. 2 is provided with an application 11, a component base 12, and a second storage 13. The application 11 includes a client application 21 and a component 22. The component 22 includes an interface 23 and a persistence object 24.

The client application 21 requires the component base 12 to retrieve and store an object through the interface 23 of the component 22.

The component base 12 is configured, for example, in the memory of a server, and includes an object managing unit 31 and a second storage interface 32. The object managing unit 31 includes an interface 33, an object caching part 34, an object persistence processing part 35, a selecting unit 36, and a switching unit 37.

The component base 12 is a base for configuring and executing the application 11. The object managing unit 31 retrieves or stores a persistence object 24 corresponding to the data in the second storage 13, in accordance with the request from the application 11. The second storage interface 32 operates as the input/output interface between the object managing unit 31 and second storage 13. The second storage 13 stores data, for example, in a record format.

The interface 33 regulates a method of storing/acquiring the persistence object 24 by the application 11, and operates as an interface between the interface 23 and object caching part 34. The object caching part 34 reduces the number of accesses to the second storage 13, by caching an object with a specific strategy for each type of object in order to improve the performance. The persistence processing part 35 performs conversion between the data in the second storage 13 and the object.

The selecting unit 36 selects a method suitable for the type of component 22 from a plurality of object managing methods that are prepared in advance based on the instructions transmitted from a user. The switching unit 37 is provided with the object caching part 34 and object persistence processing part 35 corresponding to the selected object managing method, and it automatically generates a caching mechanism suitable for the component 22. In this way, the object managing method of the object managing unit 31 is switched in accordance with the component 22.

Since one or more components are generally included in the application 11, the selecting unit 36 selects an appropriate object managing method for each component. The switching unit 37 arranges the object caching part and object persistence processing part corresponding to the selected object managing method, and generates a caching mechanism for each component.

Figure 3:
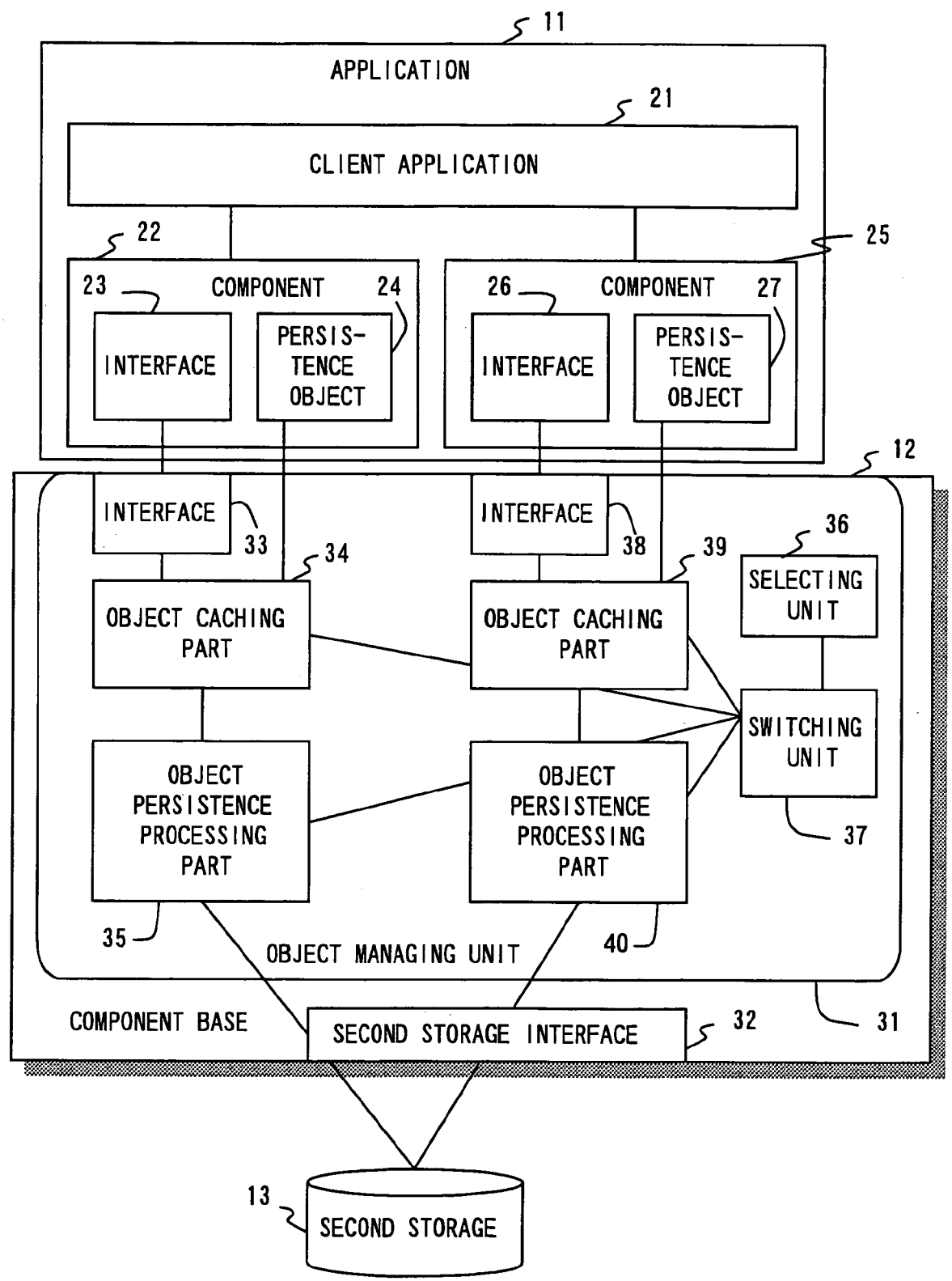
FIG. 3 is a diagram showing the configuration of the second system.

For example, in the case that the application 11 includes two components, the system like FIG. 3 is configured. The application 11 of FIG. 3 includes components 22 and 25, and the component 25 includes an interface 26 and a persistence object 27.

In this case, the selecting unit 36 selects the object managing method suitable for each of the components 22 and 25. The switching unit 37 incorporates the object caching parts 34 and 39, and the object persistence processing parts 35 and 40, into the component base 12, for the components 22 and 25, individually. Further, an interface 38 operates as the interface between the interface 26 and object caching part 39 like the interface 33.

The appropriate caching mechanism is formed for each component, by switching the object caching part and object persistence processing part for each component that is the configuration unit of the application. In this way, the object managing method suitable for the nature of application is realized.

However, the switching unit 37 need not switch both of the object caching part and object persistence processing part for each component. It can switch only one of them if necessary.

Also, as for a method of forming a caching mechanism for each component by the selecting unit 36 and switching unit 37, the following two methods are conceivable: the first method of automatically forming an object caching part and an object persistence processing part; the second method of selecting the object caching part and object persistence processing part from a group of parts that are prepared in advance. The first method is mainly used when the application 11 is configured while the second method is mainly used when the application 11 is executed.

Figure 4:
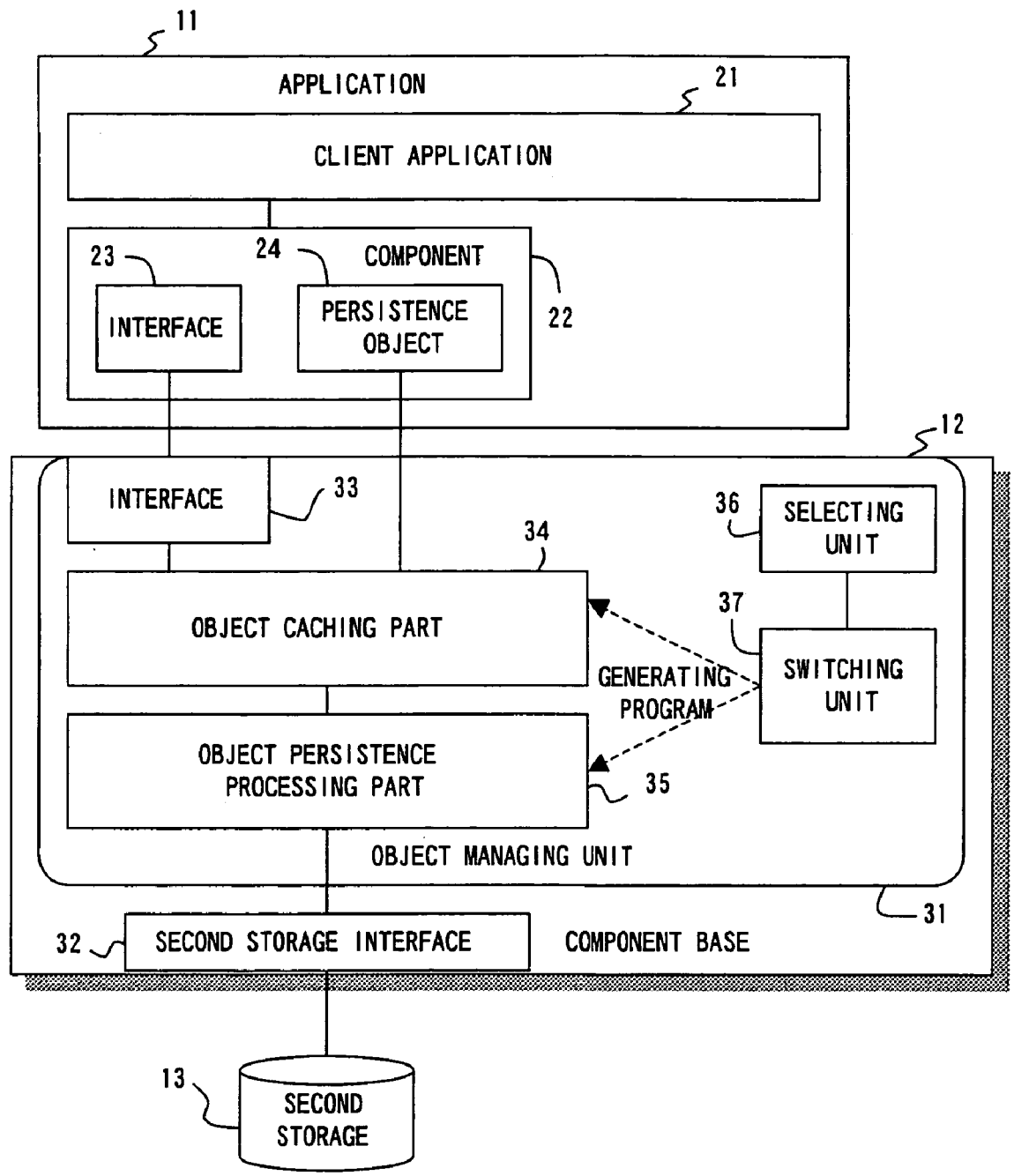
FIG. 4 is a diagram showing the configuration of the third system.

FIG. 4 shows the system based on the first method. The switching unit 37 of FIG. 4 holds in advance the templates of the programs of the object caching part 34 and object persistence processing part 35. The selecting unit 36 notifies the switching unit 37 of the selected managing method. The switching unit 37 automatically forms the object caching part 34 and object persistence processing part 35 that result in the notified object managing method, thereby incorporating these parts in the component base 12.

Figure 5:
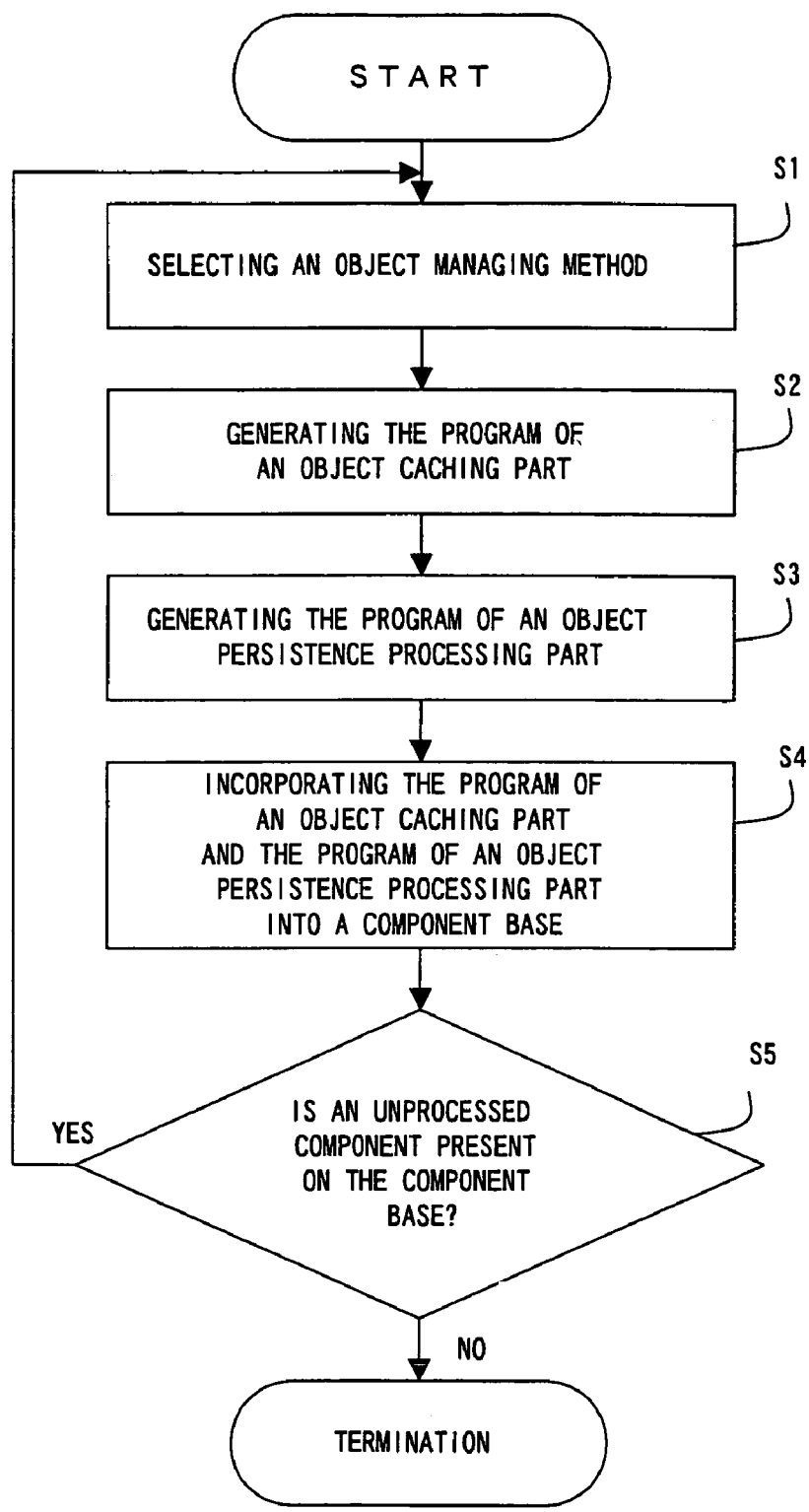
FIG. 5 is a flowchart of the first incorporating process.

FIG. 5 is a flowchart of the incorporating process performed by the object managing unit 31 of FIG. 4. Here, assume that a plurality of components to be processed exist on the component base 12.

First, the selecting unit 36 selects an object managing method for one component on the component base 12 (step S1) Next, the switching unit 37 forms the program of the object caching part that matches the selected object managing method using a template (step S2), forms the program of the object persistence processing part in accordance with the managing method (step S3), and incorporates the formed parts in the component base (step S4).

Next, the selecting unit 36 checks whether there is an unprocessed component on the component base 12 (step S5). If such a component is present, the processes in and after step S1 are repeated. When the object managing methods are selected for all the components, the process terminates.

By automatically forming the object caching part and object persistence processing part in such a way, these parts need not be prepared in advance. Examples of the program and template of the object caching part and object persistence processing part will be described later.

FIG. 6 shows the system based on the second method. The object managing unit 31 of FIG. 6 includes a storing unit 41. The selecting unit 36 stores the information that designates the selected object managing method in the storing unit 41. In this way, the object managing method suitable for the component 22 is set in the storing unit 41.

The switching unit 37 reads the information about the object managing method from the storing unit 41, and selects the parts that result in the established object managing methods from a group of object caching parts 42 and a group of object persistence processing parts 43 that are prepared in advance, thereby incorporating the selected parts in the component base 12.

Figure 7:
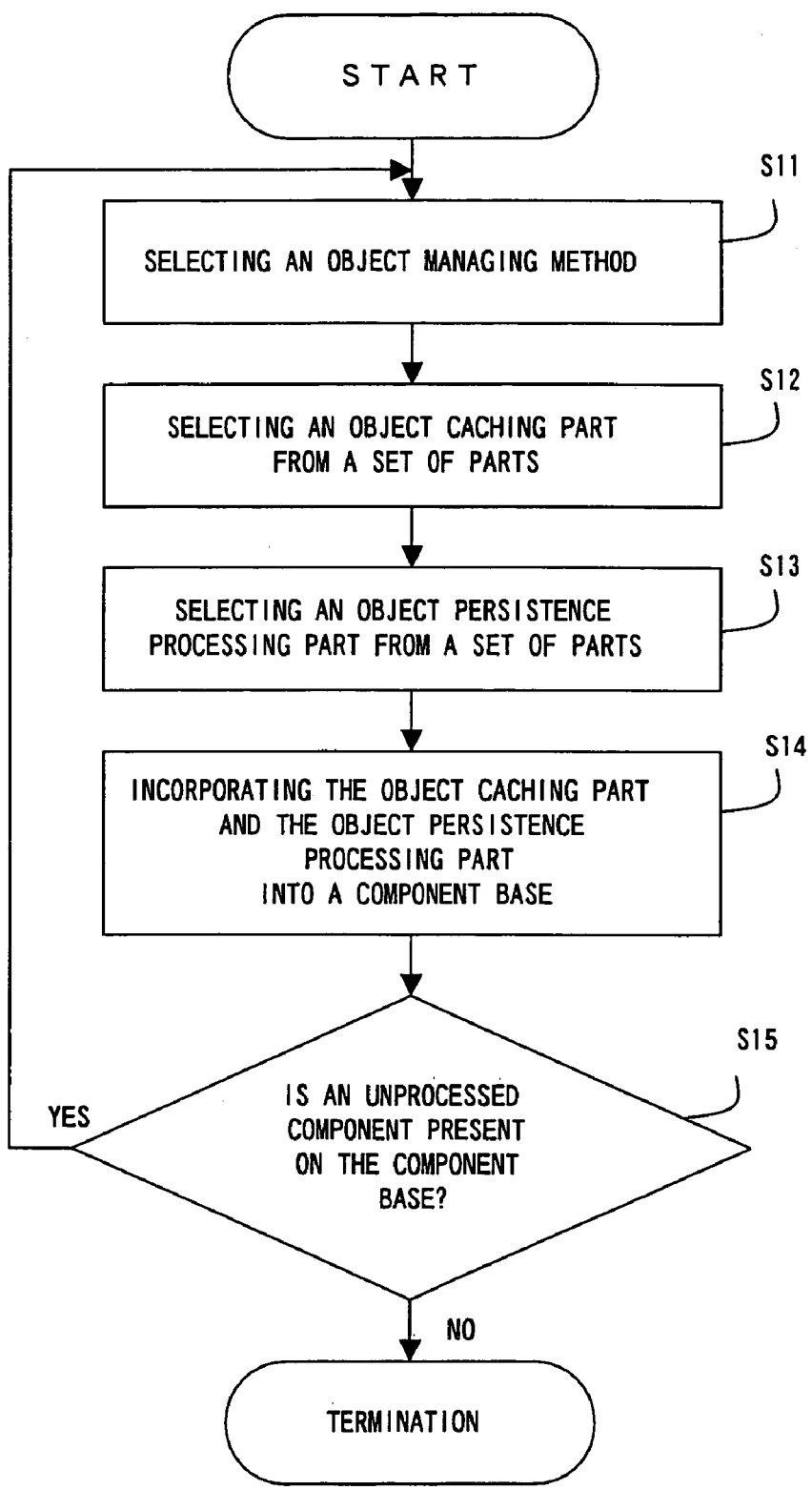
FIG. 7 is a flowchart of the second incorporating process.

FIG. 7 is a flowchart of the incorporating process performed by the object managing unit 31 of FIG. 6. Here, assume that a plurality of components to be processed exist on the component base 12. The processes performed in steps S11, S14 and S15 of FIG. 7 are the same as the processes performed in steps S1, S4, and S5 of FIG. 5.

When the selecting unit 36 selects an object managing method in step S11, the switching unit 37 selects the object caching part that matches the selected object managing method from the group of parts 42 (step S12). Then, it selects the object persistence processing part that matches the managing method from the group of parts 43 (step S13), and it performs processes in and after step S14.

By selecting an object caching part and an object persistence processing part from the groups of parts, in this way, the process of automatically generating a program need not be incorporated. Examples of the programs of the object caching part and object persistence processing part that are prepared in advance will be described later.

Figure 8:
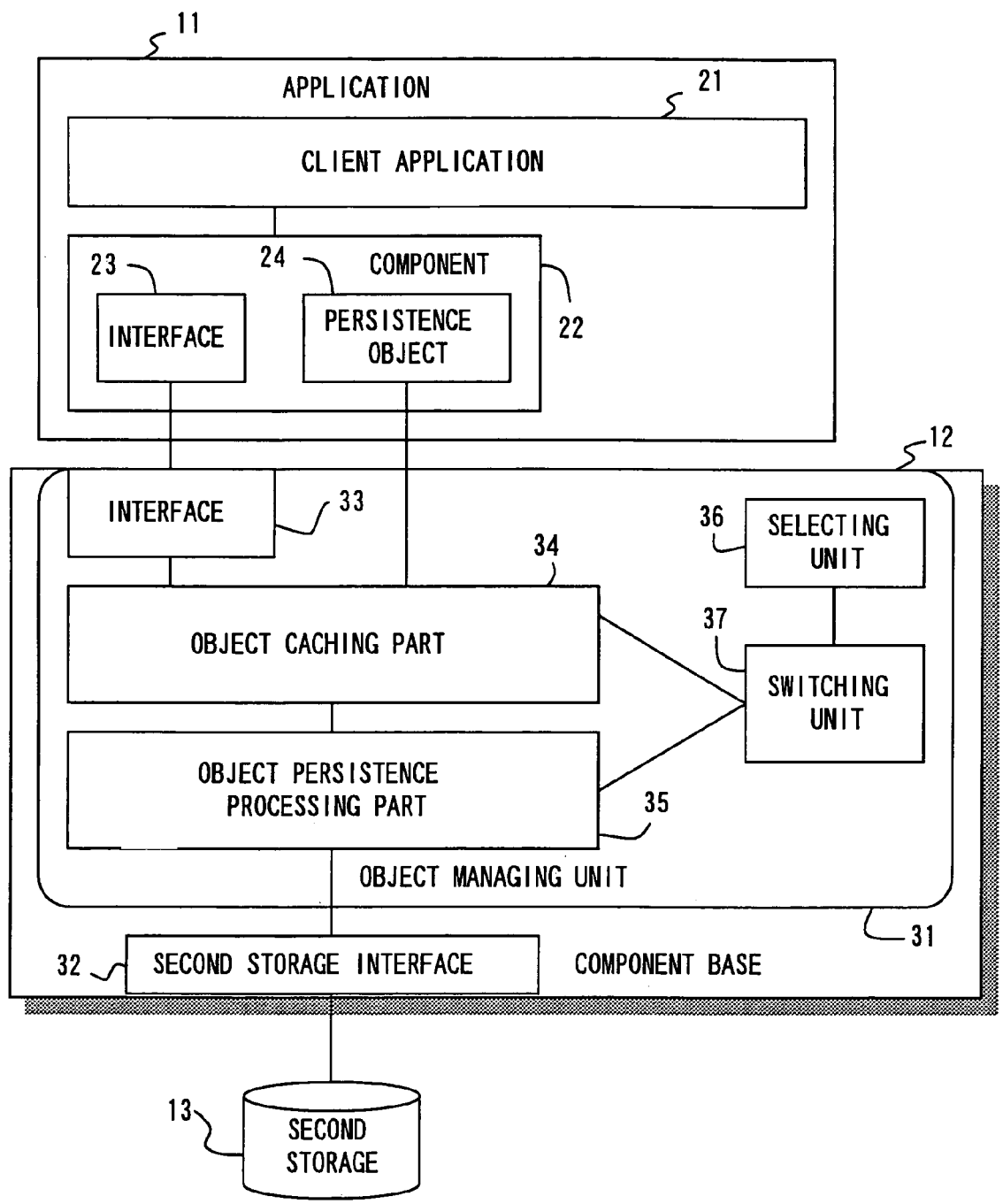
FIG. 8 is a diagram showing the configuration of the fifth system.

The selecting unit 36 can also select the object managing method designated by an application 11 other than the object managing method designated by a user. FIG. 8 shows such a system. In FIG. 8, the client application 21 designates the object managing method suitable for the component 22. The selecting unit 36 selects the designated object managing method upon receipt of the designation. According to this selecting method, a user need not designate an object managing method for each component.

Figure 9:
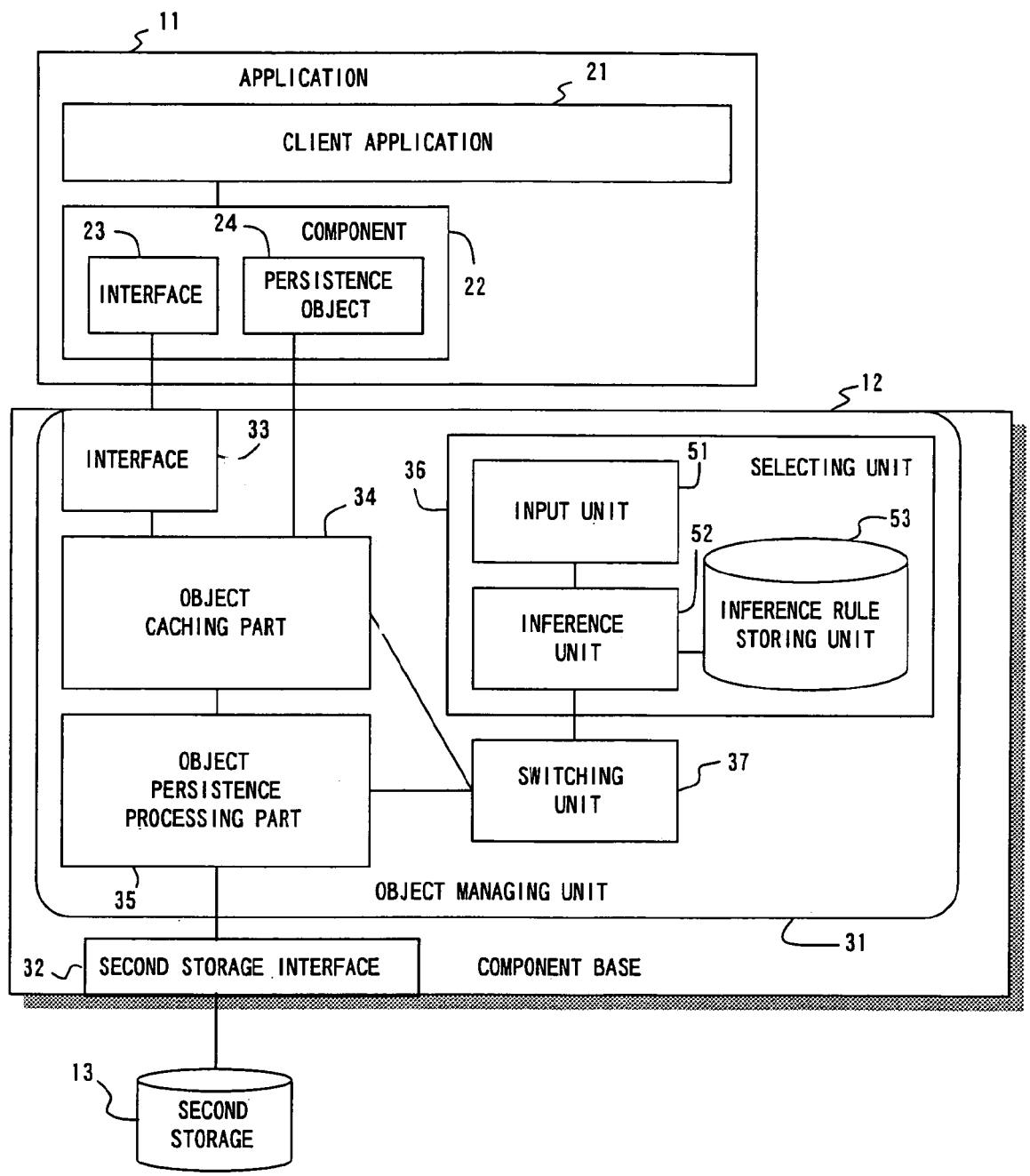
FIG. 9 is a diagram showing the configuration of the sixth system.

Further, the selecting unit 36 causes a user to input the type of application use, and the user can select an appropriate object managing method based on the input information. FIG. 9 shows such a system. The selecting unit 36 of FIG. 9 includes an input unit 51, an inference unit 52, and an inference rule storing unit 53.

The inference rule storing unit 53 holds such an inference rule for infering an appropriate object managing method. The input unit 51 inputs the usage of the component 22 designated by a user. The inference unit 52 determines the object managing method suitable for the component 22 from the type of use that is input in accordance with the inference rule of the inference rule storing unit 53. According to this selecting method, a user only has to designate the type of use of the component, resulting in that the user does not need to designate the object managing method. In the inference rule storing unit 53, an inference rule like the following is stored.

If usage=master retrieval then
   object caching part=part only performing a reference process
   object persistence processing part=part for selecting data item to be used else if usage=online slip process then
   object caching part=intra-transaction caching part
   object persistence processing part=all data item processing part else if usage=batch slip process then
   object caching part=sequentially processing part
   object persistence processing part=part for selecting data item to be used.

. . .

Here, the master retrieval process corresponds to the process of reading the original data from the second storage 13. The online slip process and batch slip process correspond to the reference/update process and other processes of the slip data in a business system.

The part performing only a reference process represents the object caching part prepared for the application that does not update but only refers to the data of an object. The intra-transaction caching part represents the object caching part that is prepared for the application for updating the data of an object. The sequentially processing part represents the object caching part prepared for the application that sequentially processes a plurality of objects that are returned as the retrieval result.

The part for selecting data items to be used represents the object persistence processing part that writes/reads only the designated items among the data of the object to/from the second storage 13. The part for processing all the data items represents the object persistence processing part that writes/reads all the data items of the object to/from the second storage 13. Examples of these parts will be explained later.

Figure 10:
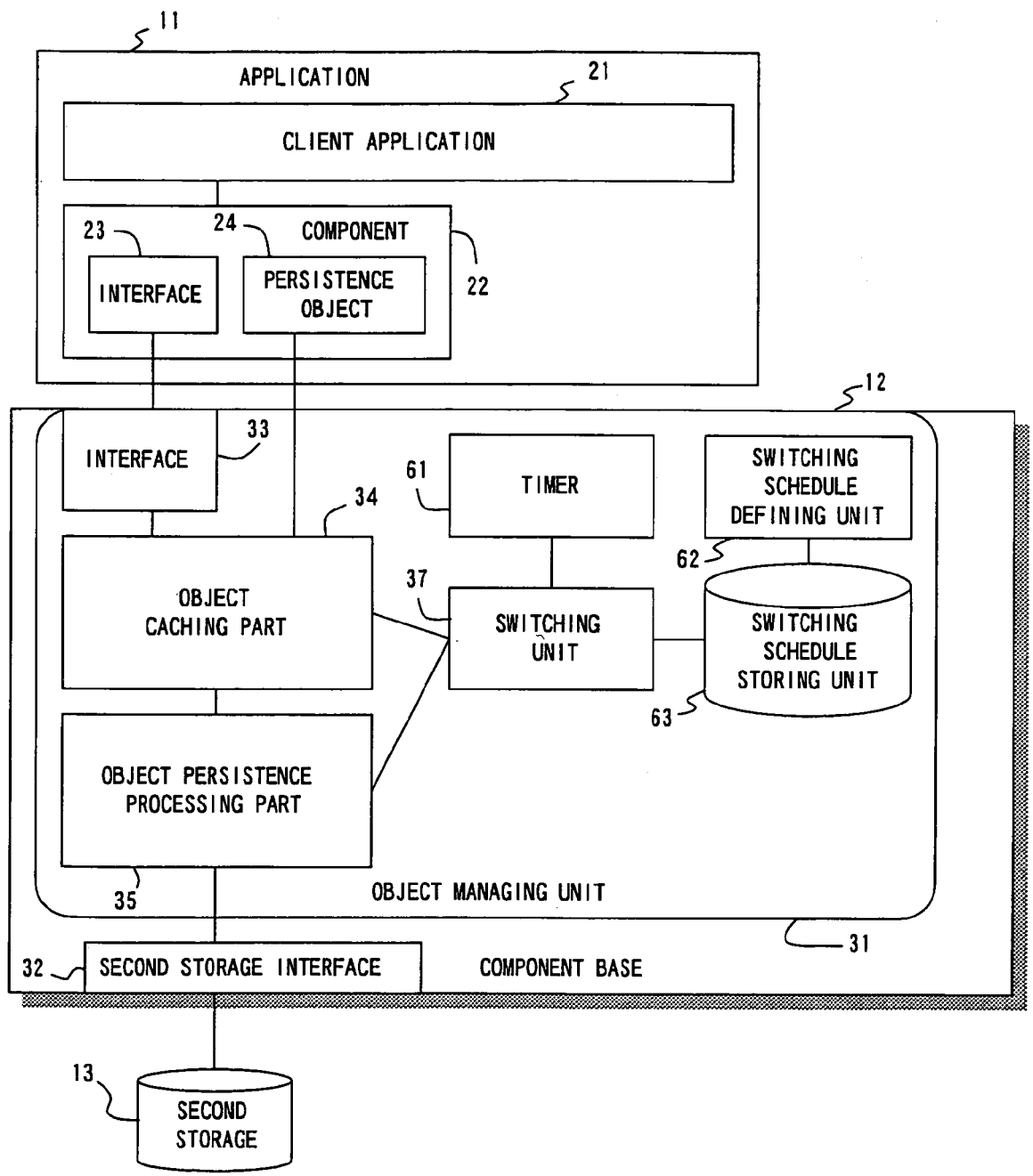
FIG. 10 is a diagram showing the configuration of the seventh system.

The switching unit 37 can also automatically perform a switching process in accordance with the predetermined schedule, instead of switching based on the object managing method that is selected by the selecting unit 36. FIG. 10 shows such a system. The object managing unit 31 of FIG. 10 includes a timer 61, a switching schedule defining unit 62, and a switching schedule storing unit 63, in place of the selecting unit 36.

The switching schedule defining unit 62 prepares the switching schedule information that defines when and which object managing method should be adopted (when and which object caching part and object persistence processing part should be used). Then the unit 62 stores the information in the switching schedule storing unit 63. Further, the timer 61 prepares time information to be output to the switching unit 37. The switching unit 37 switches between the object caching part and object persistence processing part in accordance with the switching schedule information of the switching schedule storing unit 63, with reference to the time information transmitted from the timer 61.

For example, in the case of such a system that an online slip process is performed in the day while a batch slip process is performed in the night, the switching schedule that uses the part that differs for day and night, is prepared in advance. Thus, the switching performed in accordance with the switching schedule information does not require the selection of an object managing method at the time of the operation of application.

Next, examples of the object caching part are explained in reference to FIGS. 11 to 18.

Figure 11:
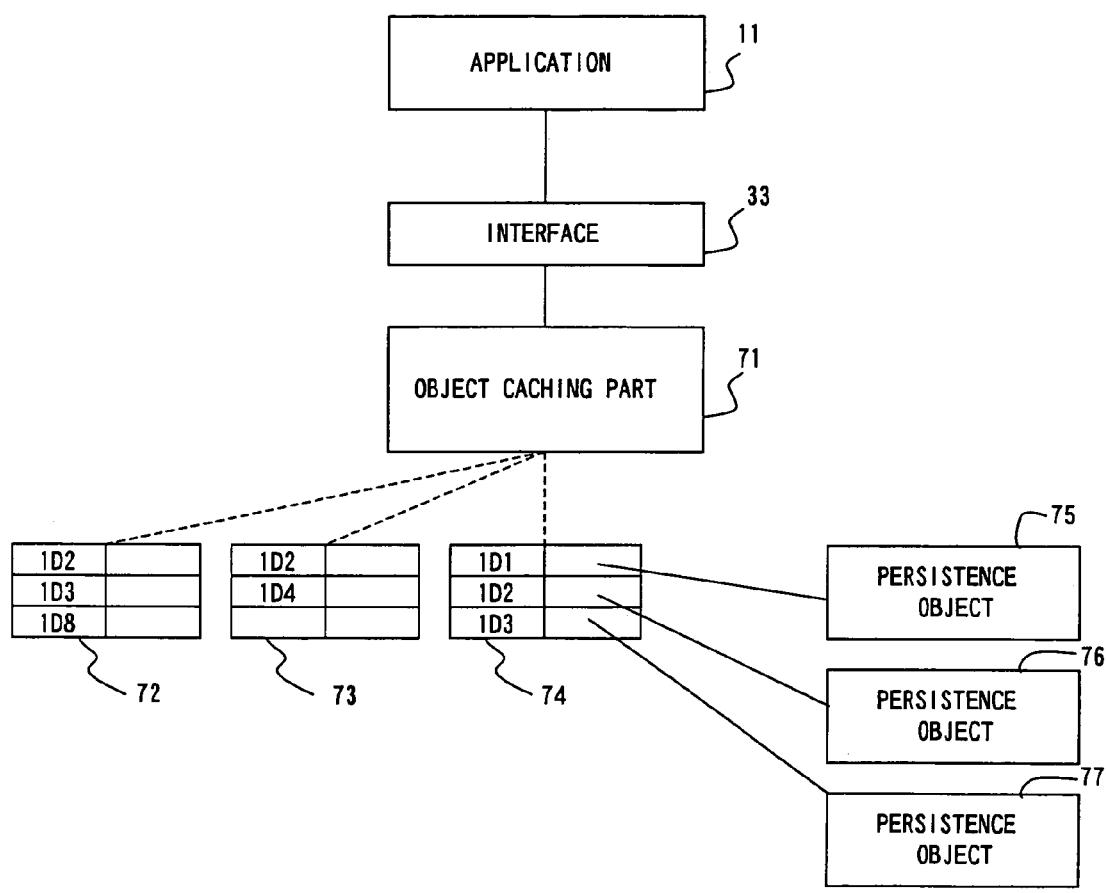
FIG. 11 is a diagram showing the caching part within transaction.

FIG. 11 shows an example of the intra-transaction caching part. An object caching part 71 of FIG. 11 is prepared for the component that updates the data of the object like the online slip processing, and it is provided with a cache table that caches the objects for each transaction. Then, the objects are registered in the cache table after the transaction starts, and the cache table is cleared at the time of the termination of transaction.

Here, the object caching part 71 holds cache tables 72, 73, and 74 that correspond to transactions A, B, and C, respectively. The persistence objects are registered in each cache table together with identification information. Among these objects, persistence objects 75, 76, and 77 that correspond to identification information ID1, ID2, and ID3, are registered in a cache table 74 to be used for a transaction C.

Figure 12:
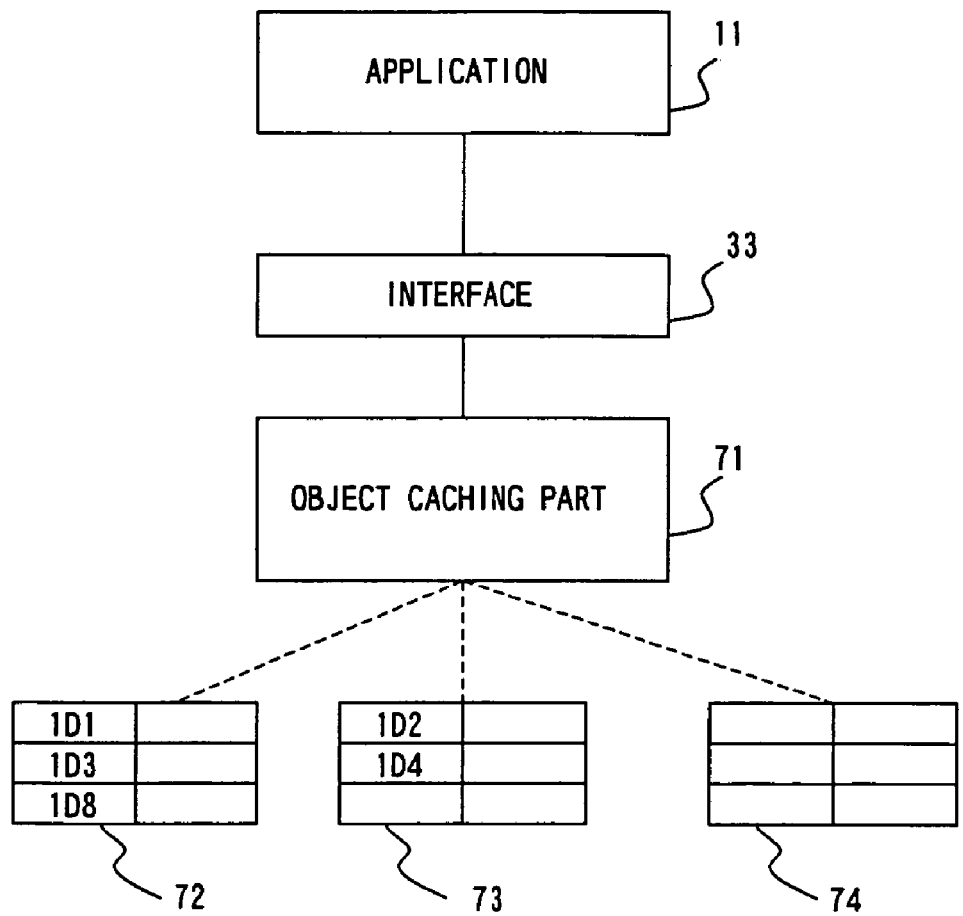
FIG. 12 is a cache table at the time of the termination of transaction.

After that, when the transaction C terminates by commitment or rollback, the object caching part 71 clears the cache table 74 as shown in FIG. 12.

According to such an object caching part, the persistence object is cached for each transaction. Since the cache is released at the time of the termination of a transaction, processes are always carried out based on the latest data.

FIG. 13 shows an example of the part performing only a reference process. An object caching part 82 of FIG. 13 is prepared for the component that only refers to the data of an object like a master retrieval process, and has a cache table common to all the transactions. Even if one transaction terminates, the cache table is not cleared, so that the other transaction can use objects registered in the same cache table.

Here, persistence objects 75, 76, and 77 are registered in the cache table 82 held by an object cashing part 81 similar to the cache table 74 of FIG. 11. Then, even if a transaction C terminates, a cache table 82 is not cleared, and transactions A and B can refer to these persistence objects.

According to such an object caching part, the persistence object is held in the cache common to a plurality of transactions, so that these transactions can use the same cache.

FIG. 14 shows an example of a sequentially processing part. An object caching part 91 of FIG. 14 is prepared for the component that sequentially processes those objects, when a set of objects is returned as the retrieval result of the object like the batch slip process. When the application 11 tries to acquire the object corresponding to the next element in the set, the data of the object that has been used up to the immediately preceding time point, is written into the second storage 13, and the data of the next element is set to the object, thereby returning the set data to the application 11.

When a retrieval request is made by the application 11, the object caching part 91 acquires a set of data from the second storage 13. Then, the part 91 forms a set object 92 that indicates a corresponding set of objects, and returns it to the application 11. At this time, the second storage interface 32 of FIG. 2 acquires the head part or whole part of a set of data (data D1, D2, and D3) from the second storage 13, thereby temporarily storing the data.

Figure 15:
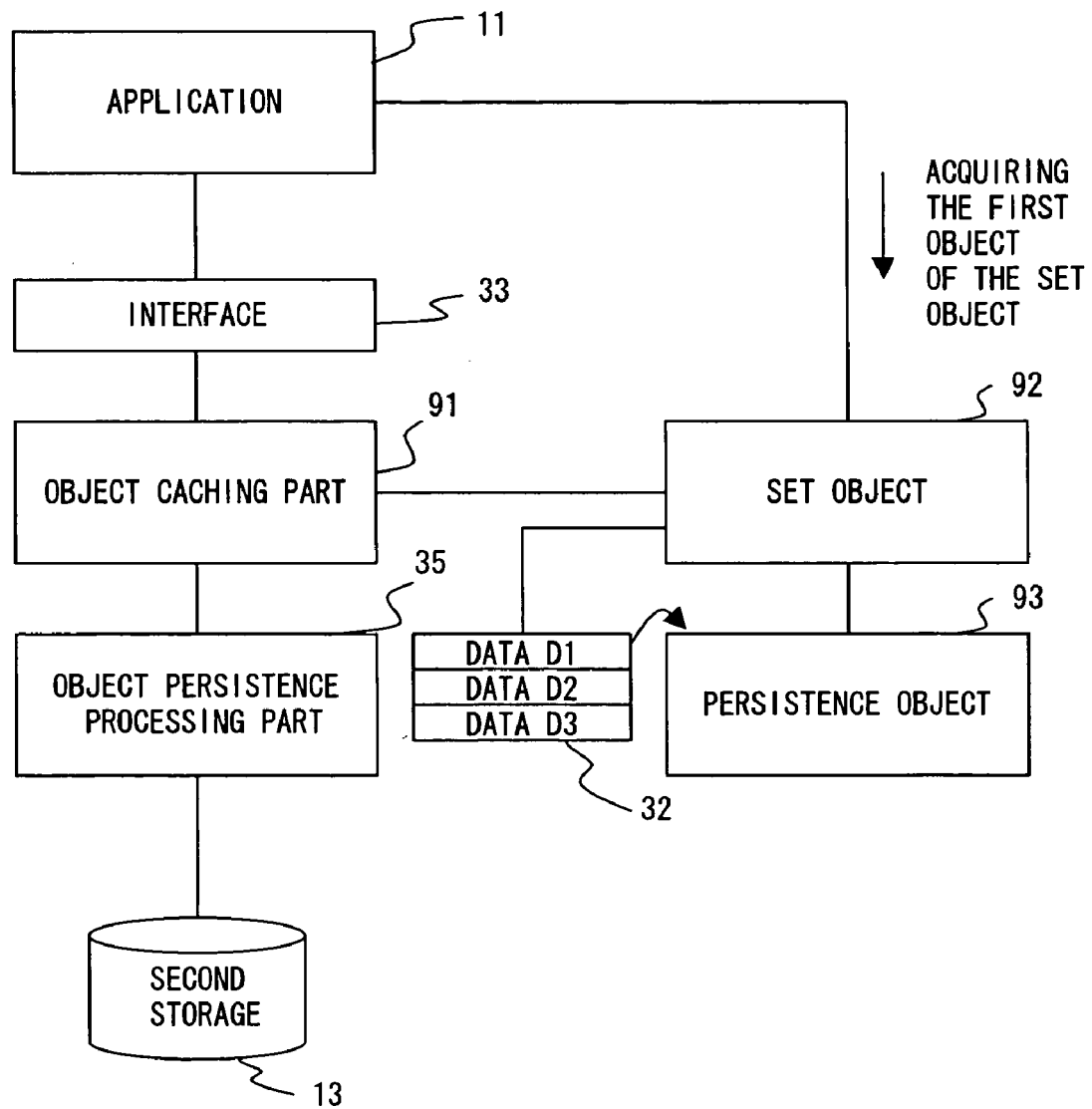
FIG. 15 is a diagram showing the acquisition of the first object.

Next, the application 11 requests the acquisition of the first object of the set object 92 as shown in FIG. 15. At this time, the object caching unit 91 sets the first data D1 in a persistence object 93 from the second storage interface 32, and returns the persistence object 93 to the application 11.

Figure 16:
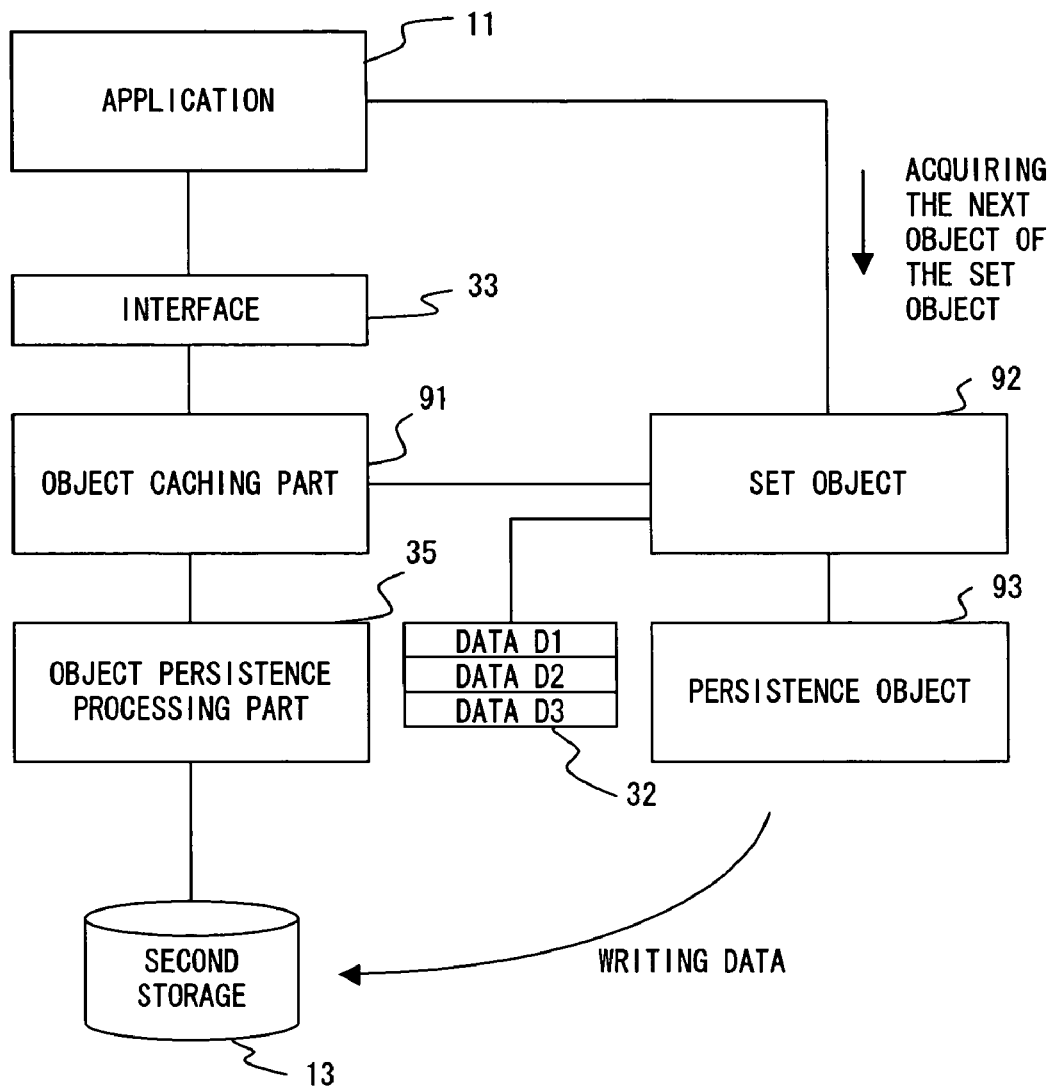
FIG. 16 is a diagram showing the writing of data.
Figure 17:
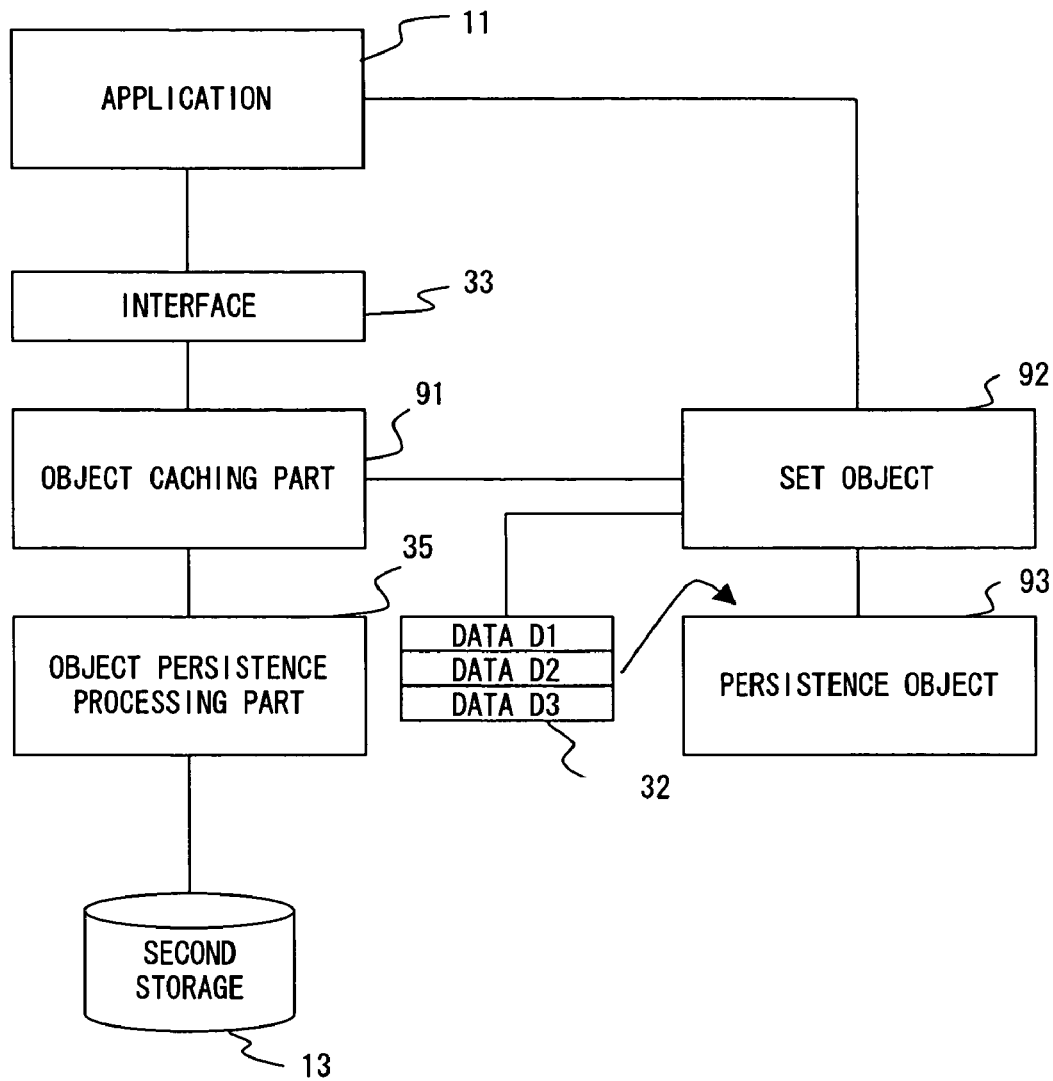
FIG. 17 is a diagram showing the acquisition of the second object.

Next, the application 11 requests the acquisition of the next object of the set object 92 as shown in FIG. 16. At this time, the object caching part 91 writes the data of the persistence object 93 in the second storage 13. Then, as shown in FIG. 17, the second data D2 from the second storage interface 32 is set to the persistence object 93, and returns the persistence object 93 to the application 11.

After that, the same processes are repeated. When all the data of the second storage interface 32 are set to the persistence object 93, the next partial data is acquired from the second storage 13. When all the data of a data set are acquired, the processes terminate.

According to such an object caching part, the data set can be passed to the application by using one persistence object repeatedly. Therefore, the number of required objects is minimized, so that the usage efficiency of the resources of a component base 12 improves.

Figure 18:
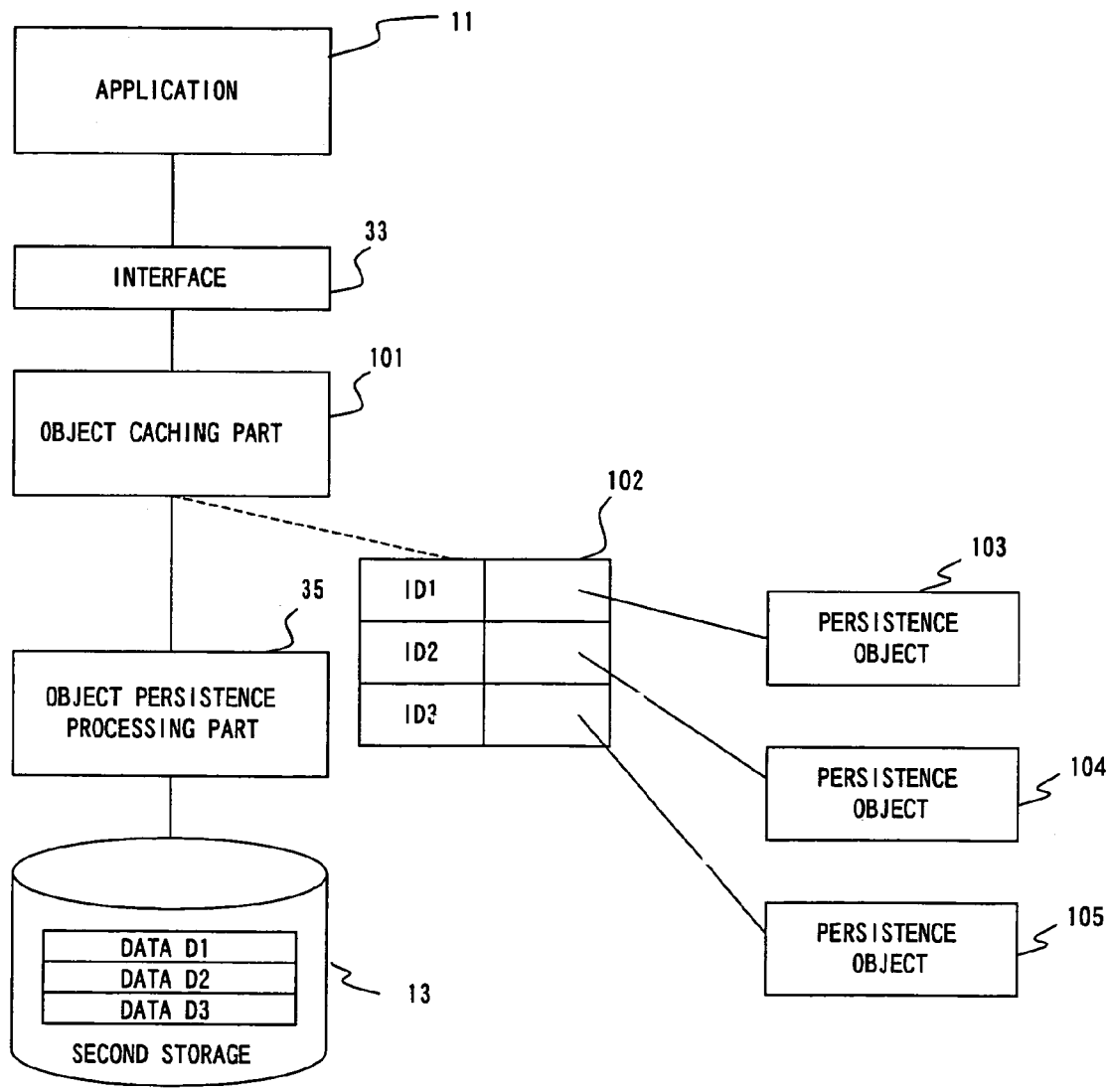
FIG. 18 is a diagram showing the caching process of all the data.

FIG. 18 shows the object caching part that caches all the data of the second storage 13. An object caching part 101 of FIG. 18 is prepared for the component that only refers to the data of the object, and is used in the case that a small amount of data is present in the second storage 13 that corresponds to the object to be referred to.

Here, all data D1, D2, and D3 in the second storage 13 are converted into persistence objects 103, 104, and 105, respectively, and the converted data are registered in a cache table 102. When a retrieval request is made by the application 11, the data can be immediately returned using the object caching part, so that the processes are performed at high speed.

Next, FIG. 19 shows an example of a selecting part selecting data items to be used that corresponds to one of the object persistence processing parts. A storing unit storing data items to be used 111 and an instructing unit instructing data items to be used 112 are included in the storing unit 41 and the selecting unit 36 of FIG. 6, respectively. The instructing unit instructing data items to be used 112 designates data items of the object to be used for each type of component, and stores the information in the storing unit storing data items to be used 111. The data items of the object correspond to, for example, the fields (attributes) of a record of the second storage 13.

When the object caching part 34 registers a persistence object 114 in a cache table 113, an object persistence processing part 115 refers to the storing unit storing data items to be used 111, reads only the designated data item from the second storage 13, and writes the data item in the second storage 13. Further, when the object caching part 34 writes the data of the persistence object 114 in the second storage 13, the object persistence processing part 115 writes only the designated data items in the second storage 13.

Here, each piece of data inside the second storage 13 is composed of three attributes of A1, A2, and A3. The object caching part 34 caches the data corresponding to identification information ID1.

For example, in the case that these three attributes are designated as data items in the storing unit storing data items to be used 111, the object persistence processing part 115 reads three attributes "aaa", "x", and "1000" corresponding to the ID1 from the second storage 13. Then, the part 115 sets the thus-read attributes to the corresponding attributes of the persistence object 114.

In the case that only the attribute A1 is designated as a data item in the storing unit storing data items to be used 111, the object persistence processing part 115 reads only "aaa" that corresponds to the attribute A1 of the ID1 from the second storage 13, and sets "aaa" to the attribute A1 of the persistence object 114.

Using such an object persistence processing part, the data of an object can be selected so as to be read or written, with regard to the required data items. Therefore, the frequency of the data transfer between the second storage 13 and component base 12 is reduced, so that the processes are performed at high speed.

Next, concrete examples of the component and component base are explained referring to FIGS. 20 to 27.

Figure 20:
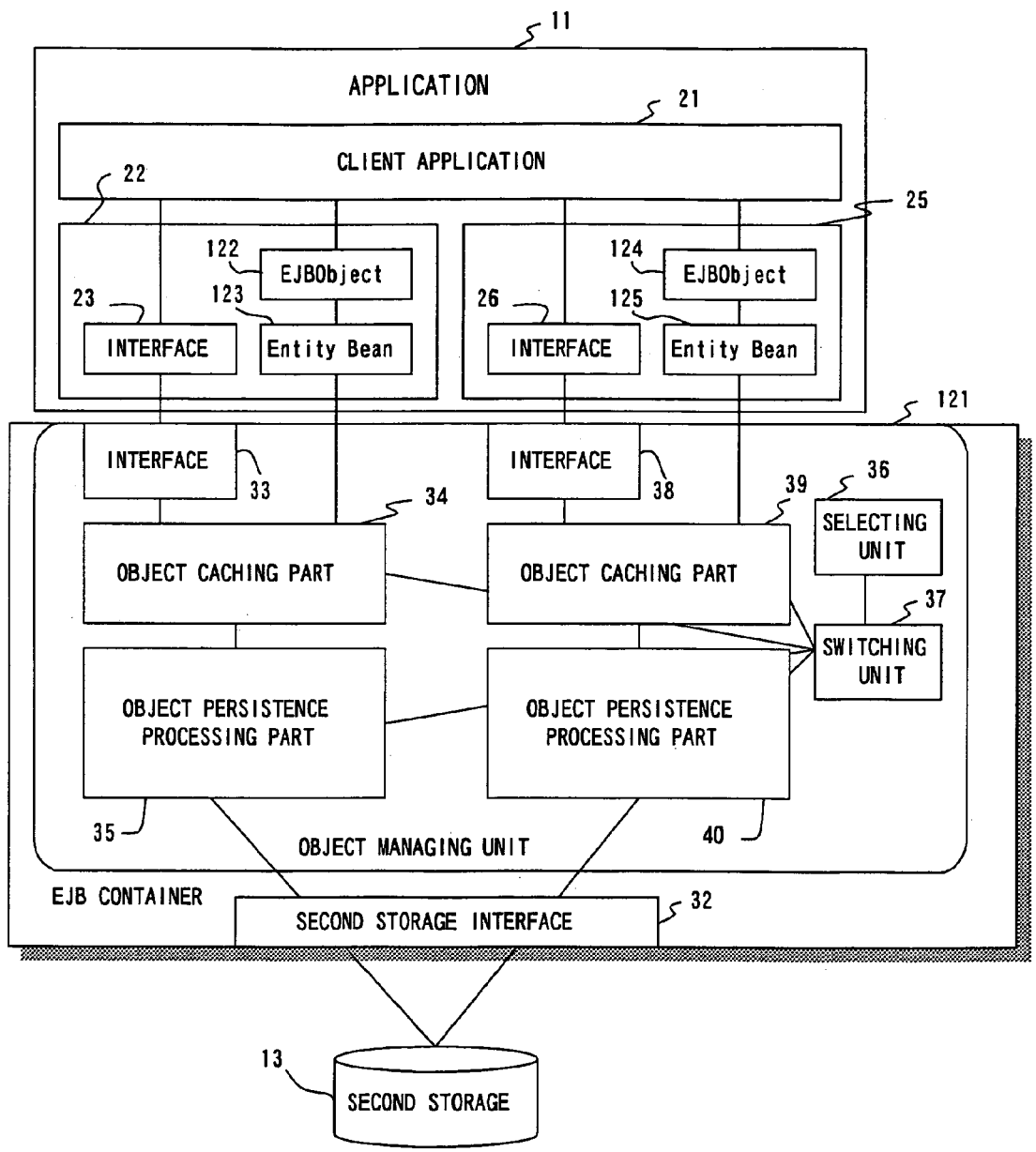
FIG. 20 is a diagram showing the configuration of the eighth system.

FIG. 20 shows a model of EJB (Enterprise JavaBeans) (trademark) corresponding to the system of FIG. 3. Here, Entity Bean corresponds to the persistence object while an EJB container 121 corresponds to the component base 12.

The component 22 includes an EJBObject 122 and an Entity Bean 123. The component 25 includes an EJBObject 124 and an Entity Bean 125. The EJBObject 122 and EJBObject 124 are such interfaces that the client application 21 accesses Entity Beans 123 and 125.

The interfaces 23 and 33 compose the interface called EJB Home, and notifies the object caching part 34 of the retrieval request, etc., made by the client application 21. The processes performed by the interfaces 26 and 38 are the same.

The object caching part 34 caches the Entity Bean with a specified strategy, and the object persistence processing part 35 performs conversion between the data in the second storage 13 and the Entity Bean. In this way, a caching mechanism of the Entity Bean is realized.

When the switching unit 37 automatically generates the program as shown in FIG. 4, it uses, for example, the templates like FIGS. 21 and 22. FIGS. 21 and 22 shows examples of the templates of the object caching part and object persistence processing part, respectively.

In FIG. 21, "$$Bean$$" represents the class name of the Entity Bean, while "$$PrimaryKey$$" represents the class name of the key of the Entity Bean.

In FIG. 22, "$$BeanFieldColumns$$" represents the sequence of the column names of the table in which the data of the Entity Bean is stored. "$$Table$$" represents the table name of the table in which the data of the Entity Bean is stored. "$$PKFieldColumns$$" represents the column name corresponding to the key field of the Entity Bean.

In this template, the statement between "//$$ foreach $$BeanField$$" and "//$$ end foreach" is repeatedly developed the number of times equivalent to the number of fields in the Entity Bean. "$$Name$$" represents the field name of the Entity Bean. "$$Type$$" represents the type of the field, while "$$Count$$" represents the repetition number.

For example, from the template of FIG. 21, the program of the object caching part like FIG. 23 is generated. "$$Bean$$" and "$$PrimaryKey$$" are replaced with "OrderBean" and "OrderBeanPrimaryKey", respectively.

Further, from the template of FIG. 22, for example, the program of the object persistence processing part like FIG. 24 is generated. In the program of FIG. 24, "$$Bean$$" is replaced with "OrderBean", and "$$BeanFieldColumns$$" is replaced with "ID, PRODUCT, QUANTITY".

Further, "$$Table$$" and "$$PKFieldColumns$$" are replaced with "ORDERTABLE" and "ID", respectively.

"ORDERTABLE" is the table name of the table for storing the data of OrderBean that is an Entity Bean. "ID", "PRODUCT" and "QUANTITY" are the column names of this table. Among these, "ID" corresponds to the key field of OrderBean.

Further, the part from "//$$ foreach $$BeanField$$" to "//$$ end foreach" is replaced with the statement that sets the data to the fields of id, product, and quantity of OrderBean.

In the case that the switching unit 37 switches the part group shown in FIG. 6, for example, the parts like FIGS. 21 and 22 are prepared in advance. FIGS. 25 and 26 show examples of the programs of the object caching part and object persistence processing part, respectively.

The object caching part of FIG. 25 is realized without relying on the type of Entity Bean to be managed. However, the object persistence processing part of FIG. 26 performs conversion between the data of the second storage 13 and the data of the Entity Bean based on the object (ClassDef, FieldDef, etc.) that represents the information of the Entity Bean (name, type, etc. of the field).

Figure 27:
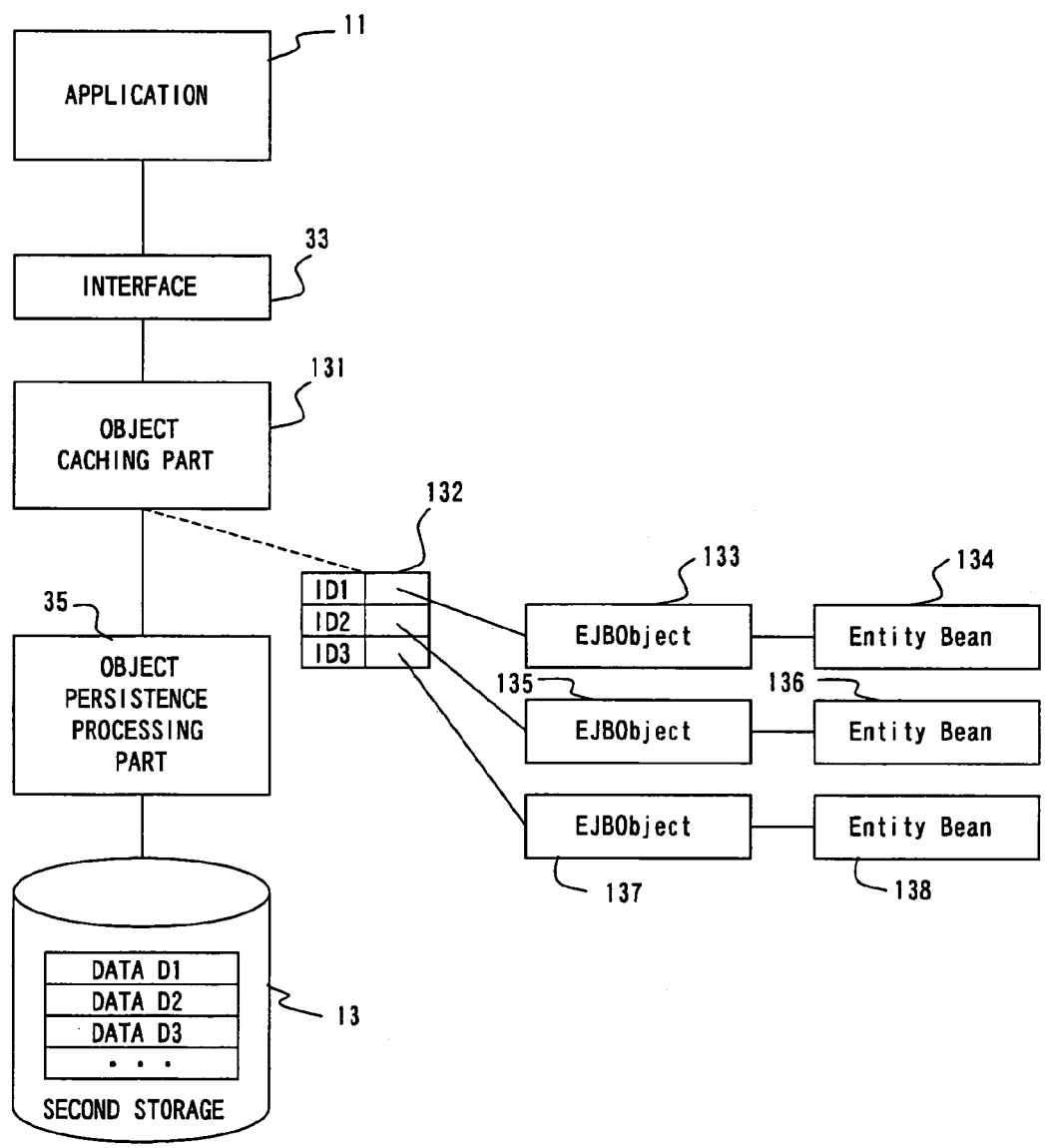
FIG. 27 is a diagram showing the caching process of an interface.

Also, in the system of FIG. 20, the object caching part can manage not only the Entity Bean but also EJBObject related to the Entity Bean in accordance with the selected object managing method. FIG. 27 shows such a caching process.

When an object caching part 131 of FIG. 27 registers the Entity Bean in a cache table 132, it also registers EJBObject corresponding to the Entity Bean. Here, an EJBObject 133 and an Entity Bean 134 are registered corresponding to the ID1, while an EJBObject 135 and an Entity Bean 136 are registered corresponding to ID2. Further, an EJBObject 137 and an Entity Bean 138 are registered corresponding to ID3.

According to such a mechanism, not only the Entity Bean but also the EJBObject can be re-used in accordance with the selected object managing method. In this way, it becomes possible to pass the corresponding EJBObject to the application 11 together with the Entity Bean. Therefore, the application 11 can immediately access the Entity Bean through the EJBObject.

Furthermore, the object managing method of the present embodiment can be applied to not only the above-mentioned EJB, but also to the component base of an arbitrary system such as CORBA (common object request broker architecture), etc.

Figure 28:
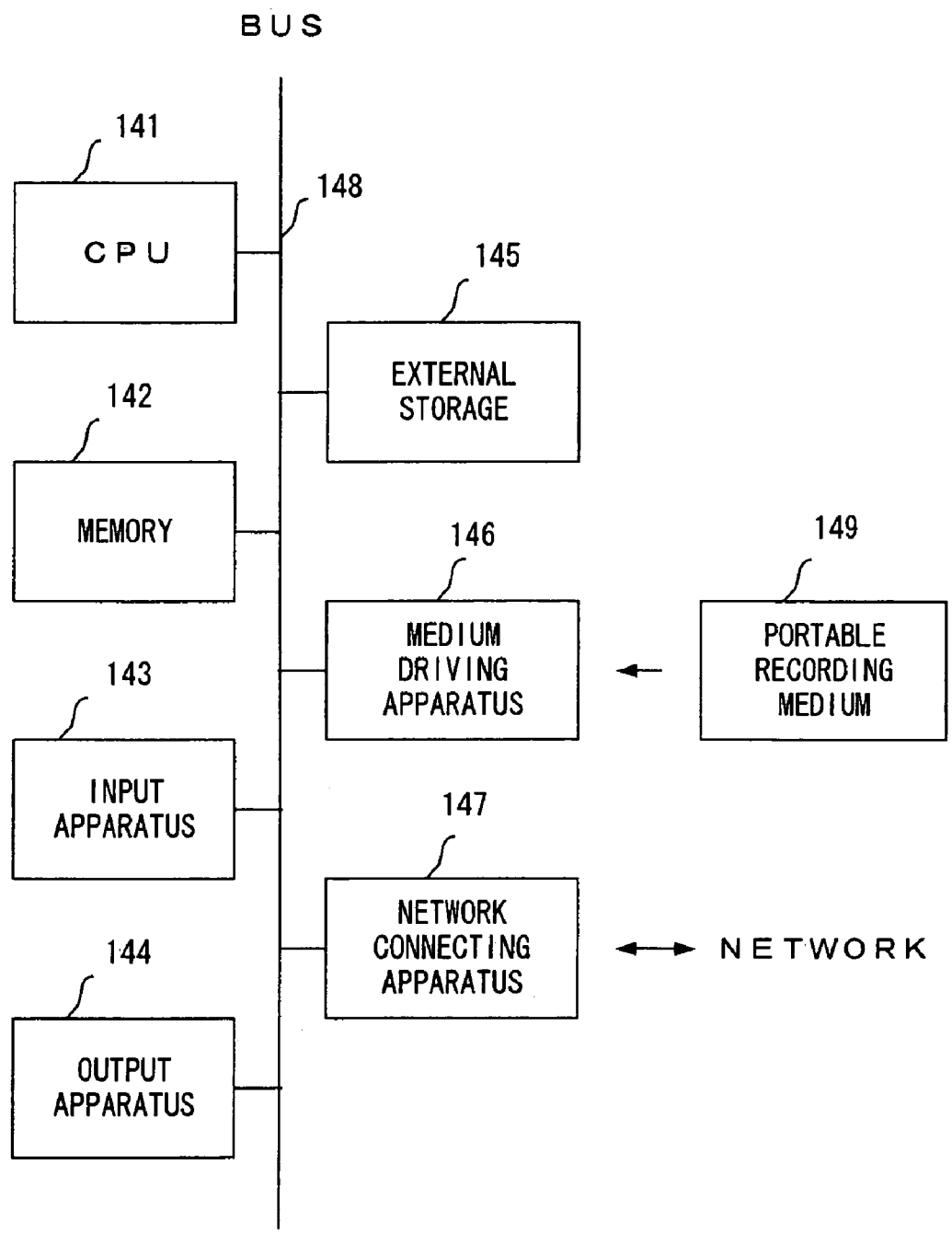
FIG. 28 is a diagram showing the configuration of an information processor.

The client and server that are included in the system of the present embodiment can be configured using the information processor (computer) as shown in FIG. 28. The information processor of FIG. 28 is provided with a CPU (central processing unit) 141, a memory 142, an input apparatus 143, an output unit 144, an external storage 145, a medium driving apparatus 146, and a network connecting apparatus 147, which are connected by a bus 148.

The memory 142 includes, for example, a ROM (read only memory), a RAM (random access memory), etc., and stores the program and data that are used for the processes. The CPU 141 performs the required processes by executing the program using the memory 142.

In this case, the application 11, component base 12, client application 21, component 22, interfaces 23 and 33, persistence object 24, object managing unit 31, second storage interface 32, object caching part 34, object persistence processing part 35, selecting unit 36, switching unit 37 of FIG. 2, and timer 61 and switching schedule defining unit 62 of FIG. 10 are stored in the memory 142 as programs. The memory 142 holds the storing unit 41 of FIG. 6, the inference rule storing unit 53 of FIG. 9, the switching schedule storing unit 63 of FIG. 10, the cache table, etc.

The input apparatus 143 includes a keyboard, a pointing device, a touch panel, etc., and is used for the input of the indications or information transmitted from an operator (user or the manager of a server). The output unit 144 includes, for example, a display, a printer, a loud speaker, etc., and is used for the output of the inquiry and the processing result to an operator.

The external storage 145 includes, for example, a magnetic disk apparatus, an optical disk apparatus, a magneto-optical disk apparatus, a tape apparatus, etc., and is used as the second storage 13 of FIG. 2. The information processor stores the above-mentioned program and data in the external storage 145, and uses them by loading them into the memory 142 if necessary.

The medium driving apparatus 146 drives the portable recording medium 149, and accesses the recorded contents. As the portable recording medium 149, an arbitrary computer-readable recording medium such as a memory card, a floppy disk, a CD-ROM (compact disk read only memory), an optical disk, a magneto-optical disk, etc., are used. An operator stores the above-mentioned program and data in the portable recording medium 149, and uses them by loading them into the memory 142, if necessary.

The network connecting apparatus 147 is connected with an arbitrary communication network such as a LAN (local area network), etc., and performs the data conversion in association with communication. Further, the information processor receives the above-mentioned program and data from the other apparatuses through the network connecting apparatus 147, and uses them by loading them into the memory 142, if necessary.

Figure 29:
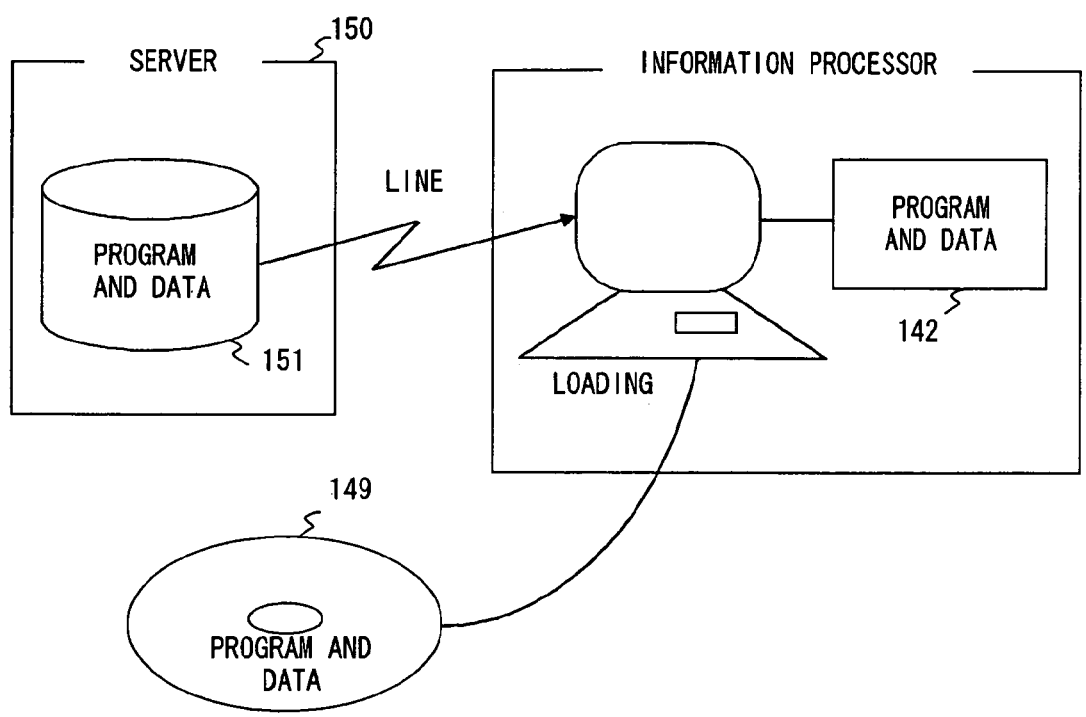
FIG. 29 is a diagram showing recording media.

FIG. 29 shows computer-readable recording media that can supply a program and data to the information processor of FIG. 28. The program and data that are stored in the portable storing medium 149 or a database 151 of a server 150 are loaded into the memory 142. At this time, the server 150 generates a propagating signal propagating the program and data, and transmits the signal to the information processor through an arbitrary transmission medium on the network.

According to the present invention, in a system configuring and operating an application by combining components, a caching mechanism suitable for each application is automatically provided by a component base. Thus, a caching mechanism is not required to be provided on an application side, and accordingly the application is effectively developed.

What is claimed is:

1. An object managing apparatus managing an object used by an application program including one or more components, in a component base that is a base for configuring and executing the application program and provides each component with an external storage access function, comprising:

a selecting device selecting an object managing method suitable for a type of a component, from a plurality of object managing methods that are prepared in advance, each object managing method representing an algorithm for managing an object used in the apparatus and including an accessing method to data stored in an external storage; and a switching device switching in the component base, at least one of an object caching part that caches a persistence object corresponding to data of the external storage using a specified algorithm and an object persistence processing part performing conversion between the data of the external storage and the persistence object, with a part corresponding to the selected object managing method, and wherein the switching device has a cache table caching an object for each transaction, and uses an object caching part that registers an object in the cache table after a transaction starts, and clears the cache table when the transaction terminates, as the part corresponding to the selected object managing method.

2. An object managing apparatus managing an object used by an application program including one or more components, in a component base that is a base for configuring and executing the application program and provides each component with an external storage access function, comprising:

a selecting device selecting an object managing method suitable for a type of a component, from a plurality of object managing methods that are prepared in advance, each object managing method representing an algorithm for managing an object used in the apparatus and including an accessing method to data stored in an external storage; and a switching device switching in the component base, at least one of an object caching part that caches a persistence object corresponding to data of the external storage using a specified algorithm and an object persistence processing part performing conversion between the data of the external storage and the persistence object, with a part corresponding to the selected object managing method, and wherein the switching apparatus has a cache table common to all transactions, and uses an object caching part which does not clear the cache table but makes the other transaction use an object on the cache table when one transaction terminates, as the part corresponding to the selected object managing method.

3. An object managing apparatus managing an object used by an application program including one or more components, in a component base that is a base for configuring and executing the application program and provides each component with an external storage access function, comprising:

a selecting device selecting an object managing method suitable for a type of a component, from a plurality of object managing methods that are prepared in advance, each object managing method representing an algorithm for managing an object used in the apparatus and including an accessing method to data stored in an external storage; and a switching device switching in the component base, at least one of an object caching part that caches a persistence object corresponding to data of the external storage using a specified algorithm and an object persistence processing part performing conversion between the data of the external storage and the persistence object, with a part corresponding to the selected object managing method, and wherein the switching device uses an object caching part that writes data of an object being used by the application program in the external storage, and sets next data to the object being used, thereby returning the data to the application program when the application program requests acquisition of an object to be processed, as the part corresponding to the selected object managing method.

* * * * *